US010946371B2

(12) United States Patent
Crossley et al.

(10) Patent No.: US 10,946,371 B2
(45) Date of Patent: Mar. 16, 2021

(54) METHODS OF TREATMENT AND USE OF SPENT EQUILIBRIUM CATALYST

(71) Applicant: The Board of Regents of the University of Oklahoma, Norman, OK (US)

(72) Inventors: Steven P. Crossley, Norman, OK (US); Nicholas M. Briggs, Norman, OK (US); Daniel E. Resasco, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 631 days.

(21) Appl. No.: 15/703,332

(22) Filed: Sep. 13, 2017

(65) Prior Publication Data
US 2018/0071726 A1 Mar. 15, 2018

Related U.S. Application Data

(60) Provisional application No. 62/393,931, filed on Sep. 13, 2016.

(51) Int. Cl.
*B01J 38/04* (2006.01)
*B01J 20/20* (2006.01)
(Continued)

(52) U.S. Cl.
CPC ............ *B01J 38/04* (2013.01); *B01J 20/205* (2013.01); *B01J 20/3085* (2013.01); *B01J 21/185* (2013.01); *B01J 23/755* (2013.01); *B01J 37/084* (2013.01); *B01J 37/18* (2013.01); *B01J 38/48* (2013.01); *C02F 1/288* (2013.01); *C02F 1/681* (2013.01); *C10G 11/182* (2013.01);
(Continued)

(58) Field of Classification Search
CPC .... B01J 20/205; B01J 20/3085; B01J 21/185; B01J 23/755; B01J 37/084; B01J 37/18; B01J 38/04; B01J 38/48; C02F 1/281; C02F 1/288; C02F 1/681; C02F 2101/32; C02F 2103/007; C02F 2303/16; C02F 2305/08; C10G 11/182
See application file for complete search history.

(56) References Cited

U.S. PATENT DOCUMENTS

2015/0114819 A1* 4/2015 Denton ................. C02F 1/72
203/31

OTHER PUBLICATIONS

Sadeghbeigi, Reza; Fluid Catalytic Cracking Handbook: An Expert Guide to the Practical Operation, Design, and Optimization of FCC Units; Elsevier (2012).
(Continued)

*Primary Examiner* — Anthony J Zimmer
*Assistant Examiner* — Syed T Iqbal
(74) *Attorney, Agent, or Firm* — Dunlap Codding, P.C.

(57) ABSTRACT

Disclosed is a method of treating spent equilibrium catalyst (ECAT) for reuse, in which a quantity of spent ECAT comprising hydrophilic particles with differing levels of metal contamination is disposed into a reactor and treated to form carbon nanotubes on the particles having metal contamination, thereby rendering at least a portion of the spent ECAT particles hydrophobic; the hydrophobic particles can then be separated from the hydrophilic particles. Also disclosed is a method of remediating an oil spill using a carbon nanotube sponge material.

16 Claims, 12 Drawing Sheets
(9 of 12 Drawing Sheet(s) Filed in Color)

(51) Int. Cl.
| | |
|---|---|
| B01J 20/30 | (2006.01) |
| B01J 38/48 | (2006.01) |
| C02F 1/28 | (2006.01) |
| C10G 11/18 | (2006.01) |
| C02F 1/68 | (2006.01) |
| B01J 37/08 | (2006.01) |
| B01J 21/18 | (2006.01) |
| B01J 23/755 | (2006.01) |
| B01J 37/18 | (2006.01) |
| C02F 101/32 | (2006.01) |
| C02F 103/00 | (2006.01) |

(52) U.S. Cl.
CPC .......... C02F 1/281 (2013.01); C02F 2101/32 (2013.01); C02F 2103/007 (2013.01); C02F 2303/16 (2013.01); C02F 2305/08 (2013.01)

(56) References Cited

OTHER PUBLICATIONS

Biswas, et al.; "Recent Process- and Catalyst-Related Developments in Fluid Catalytic Cracking," Applied Catalysis (1990), vol. 63, pp. 197-258.

Briggs, et al.; "Rapid Growth of Vertically Aligned Multi-Walled Carbon Nanotubes on a Lamellar Support," RSC Advances (2015), vol. 5, pp. 83945-83952.

Cao, et al.; "Super-Compressible Foamlike Carbon Nanotube Films," Science (2005), vol. 310, pp. 1307-1310.

Corma, et al.; "Nickel Passivation on Fluidised Cracking Catalysts With Different Antimony Complexes," Applied Catalysis A: General (1992), vol. 85, pp. 61-71.

Crossley, et al.; "Solid Nanoparticles that Catalyze Biofuel Upgrade Reactions at the Water/Oil Interface," Science (2010), vol. 327, pp. 68-72.

Dai, Hongjie; "Carbon Nanotubes: Opportunities and Challenges," Surface Science (2002), vol. 500, pp. 218-241.

D'Andrea, et al.; "Health Consequences Among Subjects Involved in Gulf Oil Spill Clean-up Activities," The American Journal of Medicine (2013), vol. 126, No. 11, pp. 966-974.

Deng, et al.; "Direct Electrochemistry of Glucose Oxidase and biosensing for Glucose Based on Boron-doped Carbon Nanotubes Modified Electrode," Biosensors and Bioelectronics (2008), vol. 23, pp. 1272-1277.

Goldwasser, et al.; "A Study of the Ni-Sb Interaction in a Rare-Earth Y-Zeolite," Journal of Catalysis (1992), vol. 135, pp. 596-608.

Gui, et al.; "Carbon Nanotube Sponges," Advanced Materials (2010), vol. 22, pp. 617-621.

Gui, et al.; "Magnetic and Highly Recyclable Macroporous Carbon Nanotubes for Spilled Oil Sorption and Separation," ACS Applied Materials & Interfaces (2013), vol. 5, pp. 5845-5850.

Hashim, et al.; "Covalently Bonded Three-Dimensional Carbon Nanotube Solids Via Boron Induced Nanojunctions," Scientific Reports (2012), vol. 2, pp. 1-8.

Wang, et al.; "Amphiphobic Carbon Nanotubes as Macroemulsion Surfactants," Langmuir (2003), vol. 19, No, 8, pp. 3091-3093.

Javey, et al.; "Carbon Nanotube Field-Effect Transistors with Integrated Ohmic Contacts and High-K Gate Dielectrics," Nano Letters (2004), vol. 4, No, 3, pp. 447-450.

Jiang, et al,; "Spinning Continuous Carbon Nanotube Yarns," Nature (2002), vol. 419, p. 801.

Chen,et al.; "Preparation of O/W Pickering Emulsion with Oxygen Plasma Treated Carbon Nanotubes as Surfactants," Journal of Industrial and Engineering Chemistry (2011), vol. 17, No. 3, pp. 455-460.

Kitiyanan, et al.; "Controlled Production of Single-Wall Carbon Nanotubes by Catalytic Decomposition of CO on Bimetallic Co-Mo Catalysts," Chemical Physics Letters (2000), vol. 317, No. 3, pp. 497-503.

Bayraktar, et al.; "Temperature-programmed Reduction of Metal-Contaminated Fluid Catalytic Cracking (FCC) Catalysts," Applied Catalysis A: General (2004), vol. 260, No. 1, pp. 125-132.

Lappas, et al.; "Effect of Metals Poisoning on FCC Products Yields: Studies in an FCC Short Contact Time Pilot Plant Unit," Catalysis Today (2001), vol. 65, No. 2, pp. 233-240.

Lau, et al.; "Superhydropobic Carbon Nanotube Forests," Nano Letters (2003), vol. 3, No. 12, pp. 1701-1705.

Lin, et al.; "Synthesis of High-Quality Vertically Aligned Carbon Nanotubes on Bulk Copper Substrate for Thermal Management," IEEE Transactions on Advanced Packaging (2010) vol. 33, No. 2, pp. 370-376.

Rico-Martinez, et al.; "Synergistic Toxicity of Macondo Crude Oil and Dispersant Corexit 9500A to the Brachionus Plicatilis Species Complex (Rotifera)," Environmental Pollution (2013), vol. 173, pp. 5-10.

Shean, et al.; "A Review of Froth Flotation Control," International Journal of Mineral Processing (2011), vol. 100, pp. 57-71.

Star, et al.; "Gas Sensor Array Based on Metal-Decorated Carbon Nanotubes," Journal of Physical Chemistry B (2006), vol. 110, No. 42, pp. 21014-21020.

Su, et al.; "Reuse of Waste Catalysts from Petrochemical Industries for Cement Substitution," Cement and Concrete Research (2000), vol. 30. pp. 1773-1783.

Cheng, et al.; "Reducibility of Metals on Fluid Cracking Catalyst," Applied Catalysis A: General (1993), vol. 103, pp. 87-103.

Subrahmanyan, et al.; "Froth Stability, Particle Entrainment and Drainage in Flotation—A Review," International Journal of Mineral Processing (1988) vol. 23, pp. 33-53.

Tessonnier, et al.; Recent Progress on the Growth Mechanism of Carbon Nanotubes: A Review, ChemSusChem (2011), vol. 4, pp. 824-847.

Welna, et al.; "Vertically Aligned Carbon Nanotube Electrodes for Lithium-ion Batteries," Journal of Power Sources (2011), vol. 196, pp. 1455-1460.

* cited by examiner

METHODS OF TREATMENT AND USE OF SPENT EQUILIBRIUM CATALYST

CROSS REFERENCE TO RELATED APPLICATIONS/INCORPORATION BY REFERENCE STATEMENT

The present patent application claims priority under 37 CFR § 119(e) to U.S. Provisional Patent Application U.S. Ser. No. 62/393,931, filed on Sep. 13, 2016, the entire contents of which are hereby expressly incorporated herein by reference.

BACKGROUND

Fluidized catalytic cracking (FCC) units use acid sites on FCC catalyst (called equilibrium catalyst, or ECAT) to convert low value high molecular weight hydrocarbons to high value olefinic gases, gasoline, and diesel oil. As a result of this conversion, carbonaceous material ("catalytic coke") is deposited on the acid sites of the catalyst, which blocks them. To restore the effectiveness of the catalyst, it must be regenerated by removing the catalyst from the reactor to a regenerator where the catalyst is heated in air to remove the accumulated carbon. After the carbon is removed, the catalyst is returned to the reactor for use and regeneration again.

Unblocking the acid sites on the FCC catalyst by removing carbon is easily accomplished by heating the catalyst in an oxygen environment; however, no feasible solutions have been found for removing metals from crude oil that deposit on and contaminate the catalyst, eventually leading to exhaustion of the catalyst. These metals (such as, but not limited to, nickel, vanadium, and iron) hinder FCC catalyst performance by causing unwanted side reactions that produce large amounts of coke and $H_2$ and lower selectivity for gasoline and other valuable products.

To mitigate the impact of metal contamination of the ECAT, the current practice is to remove a portion of the ECAT from the FCC unit and replace it with fresh ECAT fed back into the unit. Depending on the size of the FCC unit, the amount of ECAT (referred to herein as spent, or removed, ECAT) that is removed each day during operation is typically from 270 kg to 22,000 kg, depending on the size of the unit and the rate of operation. This spent ECAT is usually discarded or sent to an FCC unit that can operate with ECAT having a higher metal contamination. Ultimately, however, the spent ECAT is sent to a landfill or is used in concrete. Since the ECAT is generally taken from the FCC unit during operation, the spent ECAT contains both exhausted and non-exhausted ECAT. Since there has been no practical method for separating exhausted, metal-contaminated ECAT from the non-exhausted, still-catalytic ECAT (e.g. ECAT which may be substantially uncontaminated or have tolerable amounts of metal contamination), non-exhausted ECAT in the spent ECAT is necessarily disposed of along with contaminated, exhausted ECAT and must be replaced in the FCC unit with new ECAT.

Methods of treating the spent ECAT to conserve (recover) the still catalytic ECAT for reuse by separating it from exhausted ECAT would be desirable, and it is to such methods that the present disclosure is directed.

BRIEF DESCRIPTION OF THE DRAWINGS

This patent or application file contains at least one drawing executed in color. Copies of this patent or patent application publication with color drawing(s) will be provided by the Office upon request and payment of the necessary fee.

To assist those of ordinary skill in the relevant art in making and using the subject matter hereof, reference is made to the appended drawings, which are not intended to be drawn to scale, and in which like reference numerals are intended to refer to similar elements for consistency. For purposes of clarity, not every component may be labeled in every drawing. The embodiments depicted in the drawings are not intended to be limiting in regard to the present disclosure.

FIG. 2 also shows transmission electron microscopy (TEM) images of (Panel e) MWNTs grown on ECAT-1 (ECAT-1-C), and (Panel f) MWNTs grown on ECAT-2 (ECAT-2-C).

DETAILED DESCRIPTION

Figure 1:
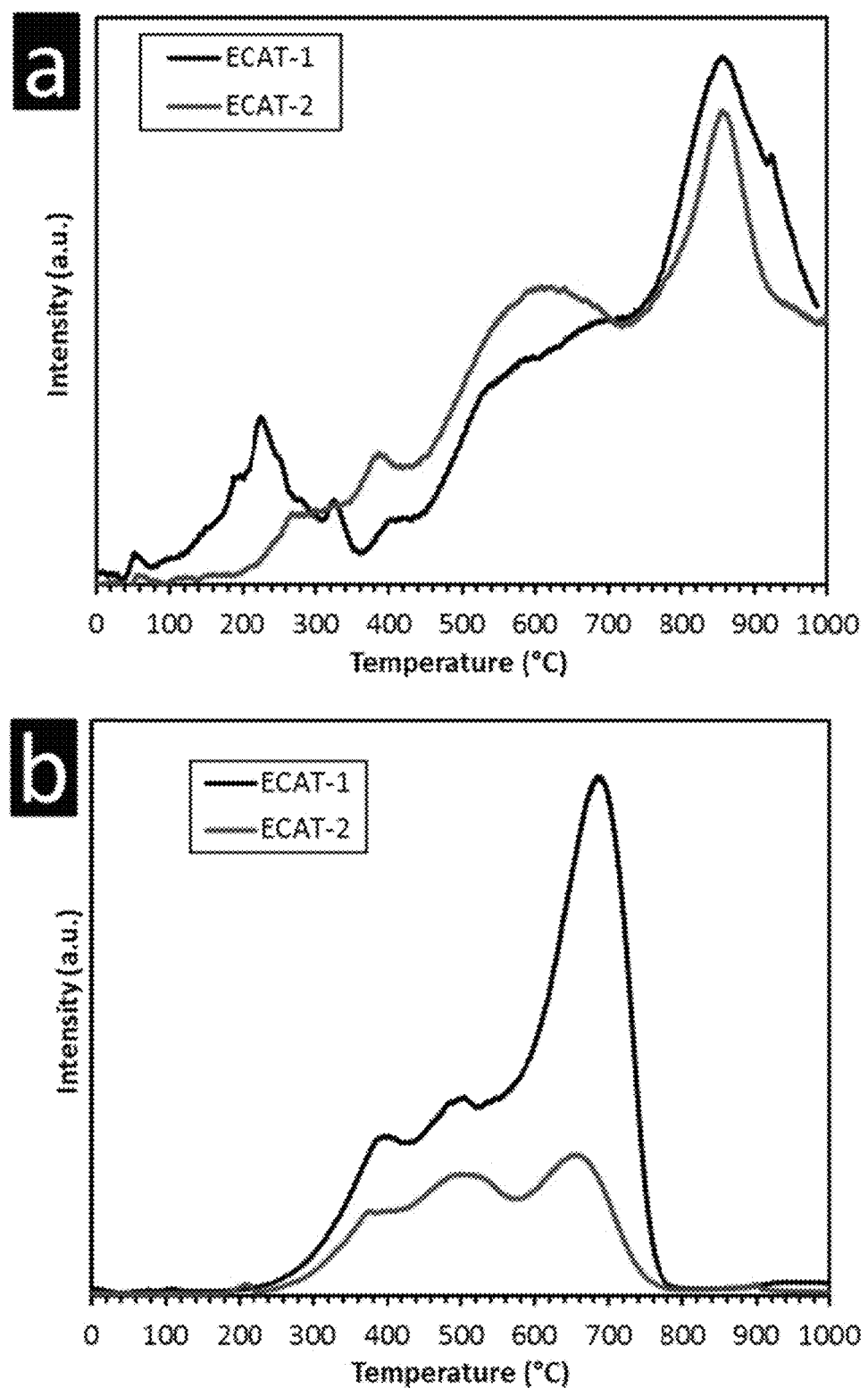
FIG. 1 is a graphical depiction of (Panel a) the temperature programmed reduction (TPR) profile for two forms of spent ECAT differing in nickel content (ECAT-1 and ECAT-2), and (Panel b) the temperature programmed oxidation (TPO) profile for ECAT-1 and ECAT-2.

Disclosed are methods of treating spent equilibrium catalyst (equilibrium catalyst removed from a fluidized catalytic cracker after use, a.k.a., ECAT) for reuse, comprising disposing a quantity of spent ECAT into a reactor, the spent ECAT comprising hydrophilic particles with differing levels of metal contamination; treating the spent ECAT in the reactor to form carbon nanotubes on the particles having metal contamination thereby rendering at least a portion of the spent ECAT particles hydrophobic; and separating the hydrophobic particles from the hydrophilic particles.

More particularly, the present disclosure is directed to, in at least certain embodiments, methods of treating spent ECAT for separating ECAT particles based on differential metal (e.g., nickel) content thereof. In at least one embodiment, ECAT that has been made differentially hydrophobic (differentially hydrophilic) based on metal content (high metal content vs. low metal content) is separated by using an oil and water system. For example, after being separated from ECAT with high metal content, ECAT with low metal content can be sent back for further use in an FCC unit. To make the high metal content ECAT differentially hydrophobic from the low metal content ECAT, spent ECAT is exposed in a reactor to conditions conducive to forming multi-walled carbon nanotubes (MWNTs). The spent ECAT particles serve as catalytic substrate for MWNT growth. The quantity of MWNTs formed on an ECAT particle is positively correlated with the metal content of the particles and is positively correlated with the hydrophobicity of the particles. MWNTs formed on an ECAT particle with high metal content thereby create a hydrophobic barrier over the surface of the ECAT particle. ECAT particles with low metal content have fewer and in some cases almost no MWNTs and are hydrophilic. The hydrophilic ECAT particles, when disposed in an oil phase/water phase mixture, will thus pass through the oil-water interface and collect in the water phase, while hydrophobic ECAT particles, when disposed in an oil phase/water phase mixture, will remain substantially in the oil phase at the oil-water interface of the mixture. Thus ECAT particles of different metal content can be separated by virtue of their different hydrophobicities. ECAT of low metal content (and having low MWNT content) can be sent back to the FCC unit for further use. ECAT of high metal content (with high MWNT content) can either be disposed of, used in structural materials, or can even be used for oil spill remediation to collect spilled oil in contaminated areas due to its high oil absorbability.

Before explaining at least one embodiment of the presently disclosed concepts in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. As such, the language used herein is intended to be given the broadest possible scope and meaning, and the embodiments are meant to be exemplary—not exhaustive. Also, it is to be understood that the phraseology and terminology employed herein is for purposes of description, and should not be regarded as limiting unless otherwise indicated as so. Moreover, in the following detailed description, numerous specific details are set forth in order to provide a more thorough understanding of the disclosure. However, it will be apparent to a person having ordinary skill in the art that various embodiments of the present disclosure may be practiced without these specific details. In other instances, features which are well known to persons of ordinary skill in the art have not been described in detail to avoid unnecessary complication of the description.

All patents, published patent applications, and non-patent publications mentioned in the specification are indicative of the level of skill of those of ordinary skill in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the devices and methods disclosed herein can be made and executed without undue experimentation in light of the present disclosure. While the devices and methods of the present disclosure have been described in terms of particular embodiments, it will be apparent to those of skill in the art that variations may be applied to the devices and/or methods and in the steps or in the sequence of steps of the method described herein without departing from the concept, spirit, and scope of the inventive concepts. All such similar substitutes and modifications apparent to those of ordinary skill in the art are deemed to be within the spirit and scope of the inventive concepts as disclosed herein.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example. Reference to an integer with more (greater) or less than includes any number greater or less than the reference number, respectively. Thus, for example, reference to less than 100 includes 99, 98, 97, etc. all the way down to the number one (1); and less than 10 includes 9, 8, 7, etc. all the way down to the number one (1).

As used in this specification, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. For example, unless otherwise noted, a process, method, article, or apparatus that comprises a list of elements is not necessarily limited to only those elements, but may also include other elements not expressly listed or inherent to such process, method, article, or apparatus.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. One of ordinary skill in the art will understand that typically there is no limit on the number of items or terms in any combination, unless otherwise apparent from the context.

As used herein, any reference to "one embodiment," "an embodiment," "some embodiments," "one example," "for example," or "an example" means that a particular element, feature, structure, or characteristic described in connection with the embodiment is included in at least one embodiment and may be included in other embodiments. The appearance of the phrase "in some embodiments" or "one example" in various places in the specification is not necessarily all referring to the same embodiment, for example, and are not necessarily limited to a single or particular embodiment. In addition, the use of the terms "one embodiment" and "an embodiment" are not to be construed as limiting in any matter of the scope of the present disclosure; unless indicated otherwise, all references to "embodiment(s)" and "example(s)" will be understood to mean "non-limiting embodiment(s)" and "non-limiting example(s)."

Throughout this application, the term "about" is used to indicate that a value includes the inherent variation of error for the compositions and/or methods of the present disclosure. As used herein, the qualifiers "about" or "approximately" are intended to include not only the exact value, amount, degree, orientation, or other qualified characteristic or value, but are intended to include some slight variations due to measuring error, manufacturing tolerances, stress exerted on various parts or components, observer error, wear and tear, and combinations thereof, for example. The term "about," where used herein when referring to a measurable value such as an amount, a temporal duration, and the like, is meant to encompass variations of ±20%, or ±10%, or ±5%, or ±1%, or ±0.1% from the specified value, as such variations are appropriate to perform the disclosed methods and as understood by persons having ordinary skill in the art. Throughout this application, the term "about" is used to indicate that a value includes the inherent variation of error for measuring various parameters. Further, in this detailed description and the appended claims, each numerical value (e.g., temperature or time) should be read once as modified by the term "about" (unless already expressly so modified), and then read again as not so modified unless otherwise indicated in context. Also, any range listed or described herein is intended to include, implicitly or explicitly, any number within the range, particularly all integers, including the end points, and is to be considered as having been so stated. For example, "a range of from 1 to 10" is to be read as indicating each possible number, particularly (but not by way of limitation) integers, along the continuum between about 1 and about 10. Thus, even if specific data points within the range, or even no data points within the range, are explicitly identified or specifically referred to, it is to be understood that any data points within the range are to be considered to have been specified in the present disclosure, and that the inventors possessed knowledge of the entire range and the points within the range.

As used herein, the term "substantially" means that the subsequently described event, circumstance, or object completely occurs, or that the subsequently described event, circumstance, or object occurs to a great extent or degree. For example, the term "substantially" means that the subsequently described event, circumstance, or object occurs at least 75% of the time, or at least 80% of the time, or at least 85% of the time, or at least 90% of the time, or at least 95% of the time, or at least 98% of the time. Alternatively, the term "substantially" means that the subsequently described event, circumstance, or object is present in at least 75%, at least 80%, at least 85%, at least 90%, at least 95%, or at least 98% of the cases.

The term "primarily" is intended to mean greater than 50%. The term "substantially" is intended to be a more limited example of "primarily."

As used herein, the term "ECAT MWNT" means ECAT upon which carbon nanotubes (CNTs) have been grown. In certain embodiments, the ECAT is obtained from an FCC unit of a petroleum processing plant during operation of the FCC unit. The CNTs may be, for example, single-walled carbon nanotubes (SWNTs), double-walled carbon nanotubes CNTs (DWNTs), and/or multi-walled carbon nanotubes CNTs (MWNTs). The term ECAT-1-C refers to ECAT MWNT material made from ECAT-1 material. The term ECAT-2-C refers to ECAT MWNT material made from ECAT-2 material. The term ECAT-Mix refers to a mixture (such as, but not limited to, a 50/50 mixture) of ECAT-1 and ECAT-2 material. The term ECAT-Mix-C refers to ECAT MWNT material made from ECAT-Mix material. The term ECAT-Mix-C-440 refers to ECAT-Mix-C material which has been calcined to remove amorphous carbon at a temperature of 440° C. ECAT-Mix-C-460 refers to ECAT-Mix-C material which has been calcined to remove amorphous carbon at a temperature of 460° C. The term ECAT-Mix-C-440-Ni refers to a "high nickel" fraction separated from ECAT-Mix-C-440 material. The term ECAT-Mix-C-460-Ni refers to a "high nickel" fraction separated from ECAT-Mix-C-460 material.

As used herein, the term "metal content separation point" means the metal content of the ECAT MWNT composition at which the separation methods of some embodiments of the present disclosure separate the ECAT MWNT composition into fractions with different metal contents. The metal content separation point may be based on individual metal content or total metal content of the ECAT. The metal content separation point may be changed by tuning process conditions, for example (but not limited to) the MWNT growth conditions, calcination (the oxidation or "combustion" step) conditions, and/or the combinations of hydrophilic and/or hydrophobic liquid used in separation and various other separation method conditions. For example, an ECAT MWNT composition separation method which separates an ECAT MWNT composition with a metal content below about 400 ppm from an ECAT MWNT composition with a metal content above about 400 ppm has a metal content separation point of about 400 ppm. An ECAT MWNT composition separation method which separates an ECAT MWNT composition with a metal content below about 500 ppm from an ECAT MWNT composition with a metal content above about 500 ppm has a metal content separation point of about 500 ppm. An ECAT MWNT composition separation method which separates an ECAT MWNT composition with a metal content below about 1000 ppm from an ECAT MWNT composition with a metal content above about 1000 ppm has a metal content separation point of about 1000 ppm. In certain non-limiting embodiments, the metal content separation point of the present disclosure may be in a range of from about 200 ppm to about 10000 ppm, such as (but not limited to) 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 2000 ppm, 3000 ppm, 4000 ppm, 5000 ppm, 6000 ppm, 7000 ppm, 8000 ppm, 9000 ppm, or 10000 ppm.

As used herein, the term "metal contaminated ECAT" or "high metal content ECAT" refers to an ECAT material that has a metal content (e.g., as measured by ppm or weight percent) such that when the ECAT material is exposed to CNT-forming conditions, the ECAT particles are rendered hydrophobic such that they preferentially remain in the oil phase of an oil-water biphasic mixture. As used herein, the term "non-metal contaminated ECAT" or "low metal content ECAT" refers to an ECAT material that has a metal content (e.g., as measured by ppm or weight percent) such that, when the ECAT material is exposed to CNT-forming conditions, the ECAT particles are hydrophilic after treatment such that they preferentially remain in the water phase of an oil-water biphasic mixture. The ECAT metal content may comprise one or more of nickel, vanadium, iron, antimony, or any combinations thereof, for example (but not by way of limitation), or various other metals which are deposited on the ECAT during FCC operation.

As defined herein, the term "high metal particles" may refer to spent ECAT particles substantially all (e.g., 90%) of which have a metal content (of one or more metals) above a particular metal content separation point (as defined above), and the term "low metal particles" may refer to spent ECAT particles substantially all (e.g., 90%) of which have a metal content (of one or more metals) below a particular metal content separation point (as defined above).

As noted previously, disclosed herein are methods of treating spent equilibrium catalyst (equilibrium catalyst removed from a fluidized catalytic cracker after use, a.k.a., ECAT) for reuse, comprising disposing a quantity of spent ECAT into a reactor, the spent ECAT comprising hydrophilic particles with differing levels of metal contamination; treating the spent ECAT in the reactor to form carbon nanotubes on the particles having metal contamination, thereby rendering at least a portion of the spent ECAT particles hydrophobic; and separating the hydrophobic particles from the hydrophilic particles. More particularly, the present disclosure is directed to, in at least certain embodiments, methods of treating spent ECAT for separating ECAT particles based on differential metal (e.g., nickel) content thereof. In at least one embodiment, ECAT that has been made differentially hydrophobic (differentially hydrophilic) based on metal content (high metal content vs. low metal content) is separated by using an oil and water system. For example, after being separated from ECAT with high metal content, ECAT with low metal content can be sent back for further use in an FCC unit. To make the high metal content ECAT differentially hydrophobic from the low metal content ECAT, spent ECAT is exposed in a reactor to conditions conducive to forming multi-walled carbon nanotubes (MWNTs). The spent ECAT particles serve as catalytic substrate for MWNT growth. The quantity of MWNTs formed on an ECAT particle is positively correlated with the metal content of the particles and is positively correlated with the hydrophobicity of the particles. MWNTs formed on an ECAT particle with high metal content thereby create a hydrophobic barrier over the surface of the ECAT particle. ECAT particles with low metal content have fewer—and in some cases almost no—MWNTs and are hydrophilic. The hydrophilic ECAT particles, when disposed in an oil phase/water phase mixture, will thus pass through the oil-water interface and collect in the water phase, while hydrophobic ECAT particles, when disposed in an oil phase/water phase mixture, will remain substantially in the oil phase at the oil-water interface of the mixture. Thus ECAT particles of different metal content can be separated by virtue of their different hydrophobicities. ECAT of low metal content (and having low MWNT content) can be sent back to the FCC unit for further use. ECAT of high metal content (with high MWNT content) can either be disposed of, used in structural materials, or even used for oil spill remediation to collect spilled oil in contaminated areas, due to its high oil absorbability.

Production of ECAT MWNT

Carbon nanotubes can be grown on spent ECAT using a variety of reactors known in the art, such as (but not limited to) packed bed reactors, fluidized bed reactors, structured catalytic reactors, moving bed reactors, batch reactors, and the like. Spent ECAT is exposed to a carbon-containing gas or liquid in a reactor at a suitable temperature whereby CNTs are grown on the ECAT particles.

Non-limiting examples of suitable carbon-containing gases and gasified liquids which may be used herein to form CNTs on ECAT particles include aliphatic hydrocarbons, both saturated and unsaturated, such as (but not limited to) methane, ethane, propane, butane, hexane, ethylene, and propylene; carbon monoxide (CO); oxygenated hydrocarbons such as (but not limited to) ketones, aldehydes, and alcohols including (but not limited to) ethanol and methanol; aromatic hydrocarbons such as (but not limited to) toluene, benzene, and naphthalene; molecules which contain carbon and nitrogen such as (but not limited to) acetonitrile and pyridine; gases containing boron; and mixtures of the above, for example (but not by way of limitation) carbon monoxide and methane. The carbon-containing gas may optionally be mixed with a diluent gas such as (but not limited to) helium, nitrogen, argon, or hydrogen, or mixed with a gasified liquid such as (but not limited to) water vapor.

In certain embodiments, reaction temperature for CNT growth may be, but is not limited to, a temperature in a range of from about 600° C. to about 1500° C., such as (but not limited to) a range of from about 650° C. to about 1000° C., or a range of from about 750° C. to about 900° C. The process may use high gas flow rates, thereby minimizing the external diffusional effects and maximizing the heat transfer rate. In certain embodiments, the process utilizes a high space velocity (e.g., above 30,000 $h^{-1}$) to minimize the concentration of CO (a by-product of the reaction) in the reactor, which inhibits the conversion to nanotubes. A high carbon-gas concentration may be used to reduce the formation of amorphous carbon deposits, which may occur at low CO reactive gas concentrations.

In certain non-limiting embodiments, a quantity of spent ECAT is introduced into a reactor. After the ECAT had been introduced into the reactor, the ECAT is treated with a heated inert gas (such as, but not limited to, He) under high pressure (at, for example (but not by way of limitation), 1 atm to about 40 atm), which functions both to preheat the ECAT to a high temperature, for example (but not by way of limitation) 700° C., and to remove air from the ECAT in preparation for the subsequent reduction step. In one particular non-limiting embodiment, the preheating temperature is about 700° C., but in alternative non-limiting embodiments, the preheating temperature can be in the range of from about 500° C. to about 1200° C. Alternatively, the ECAT may be pre-treated with a heated reducing gas (such as, but not limited to, hydrogen).

The ECAT is then exposed to a reducing gas such as (but not limited to) $H_2$ at, for example (but not by way of limitation) 850° C., under for example, high pressure (at, for example (but not by way of limitation), 1 atm to about 40 atm), which reduces, at least partially, the spent ECAT to prepare it for exposure to a carbon-containing gas. In one particular (but non-limiting) embodiment, the temperature of the heated reducing gas is about 850° C., but in alternative non-limiting embodiments, the temperature of the heated reducing gas may be in the range of about 700° C. to about 1000° C. For example (but not by way of limitation), the heated reducing gas is $H_2$ or $NH_3$.

The reducing gas is then flushed from the heated spent ECAT by an inert gas such as (but not limited to) $N_2$ heated, for example (but not by way of limitation) to 760° C., under high pressure (at, for example (but not by way of limitation), 1 atm to about 40 atm), which also reheats the ECAT for the next step. In one embodiment the temperature of the reheating gas is about 760° C., but in alternative non-limiting embodiments, the temperature of the reheating gas is in the range of from about 600° C. to about 1200° C. In certain non-limiting embodiments, the reheating gas is $N_2$, but may be Ar, or He, in other embodiments, for example, or other inert gases or mixtures thereof.

Next, an amount of a carbon-containing gas (such as (but not limited to) $C_2H_4$) is heated to a suitable reaction temperature such as, but not limited to, 760° C. and under high pressure (at, for example (but not by way of limitation), 1 atm to about 40 atm) is exposed to the reduced ECAT. The carbon-containing gas may be disposed in an inert gas, such as (but not limited to) $N_2$, Ar, or He, for delivery to the reactor. It is during this stage that carbon nanotubes and other forms of carbon, such as (but not limited to) graphitic carbon and amorphous carbon, are formed on the ECAT. As noted, in one non-limiting embodiment, the temperature of the heated carbon-containing reaction gas is about 760° C., but in alternative non-limiting embodiments, the temperature of the heated carbon-containing reaction gas is in the range of from about 600° C. to about 1500° C. Any carbon-containing gas which functions in accordance with the present disclosure may be utilized as the heated carbon-containing reaction gas. In one non-limiting embodiment, the heated carbon-containing reaction gas may be $C_2H_4$, but in alternative non-limiting embodiments, may be $CH_4$, CO, $C_2H_2$, $C_2H_6$, $C_3H_8$, $C_3H_6$, $C_4H_{10}$, acetonitrile, pyridine, toluene, or mixtures thereof.

In a subsequent step after CNT formation, the reacted ECAT is exposed to a heated post reaction gas, such as (but not limited to) He, $N_2$, or Ar, or any other inert gas or mixtures thereof, under high pressure (at, for example (but not by way of limitation), 1 atm to about 40 atm) and heated, for example (but not by way of limitation), to 760° C. which functions to flush (purge) the carbon-containing gas remaining from the previous step. In alternative non-limiting embodiments, the temperature of the heated post reaction gas may be in a range of from about 300° C. to about 800° C.

In a following step, the flushed ECAT is cooled with a cooling gas, such as (but not limited to) $N_2$ or other inert gas (e.g., He or Ar) under high pressure (at, for example (but not by way of limitation), 1 atm to about 40 atm) at a temperature below the flushing temperature, for example (but not limited to) below 500° C. or lower, such as (but not limited to) in a range of from about 0° C. to about 460° C. For example, the temperature of the cooling gas may be a moderate temperature sufficient to cool the ECAT to a temperature lower than or about equal to that under which the following step will be carried out.

After the reacted ECAT has been cooled, it is exposed to a stream of a heated oxidative gas such as (but not limited to) $O_2$ at a temperature in a range of from 440° C. to 460° C., and under high pressure (at, for example (but not by way of limitation), 1 atm to about 40 atm), wherein amorphous carbon particles are burned away from the ECAT, substantially leaving only carbon nanotubes on the surface of the ECAT particles. Then the oxidized ECAT is removed from the reactor. The temperature of the heated combustion gas may be, for example (but not by way of limitation), in a range of from about 300° C. to about 700° C. The heated combustion gas may be $O_2$, for example (but not by way of limitation) as about 2% to about 5% of a gas mixture (e.g., mixed with He), or may be air or an air mixture with He, or in other non-limiting embodiments, for example, in another gas which functions in accordance with the present disclosure to cause oxidation of the amorphous carbon on the ECAT MWNT material.

The quality of the ECAT MWNT material produced by the methods of the present disclosure may be assessed, for example, by a combination of characterization techniques involving Temperature Programmed Reduction ("TPR"), Temperature Programmed Oxidation ("TPO"), Transmission Electron Microscopy ("TEM"), and Scanning Electron Microscopy ("SEM"). In certain particular (but non-limiting) embodiments disclosed herein, SEM Characterization was performed with a Zeis NEON 40 EsB using an accelerating voltage of 5 kV. SEM was used to see the carbon nanotubes on the ECAT surface and carbon nanotube orientation. For TEM characterization, a JEOL 200FX was used that was equipped with a $LaB_6$ filament and an accelerating voltage of 200 kV. TEM images were used for measuring the inner and outer diameter of the carbon nanotubes. TPR of the ECAT catalyst was carried out using an in house built system. An SRI 110 thermal conductivity detector ("TCD") was used to analyze the effluent gas that was passed over drierite before entering the TCD, which was then analyzed with argon gas flown at the same rate. A flow rate of 30 sccm (standard cubic centimeters per minute) of 5% $H_2$ in argon was passed through a ¼" quartz tube packed with quartz wool and 150 mg of sample. The temperature was ramped to 900° C. at 10° C./minute and then held at 900° C. for ten minutes. TPO of samples was carried out using an in house built system. A ¼" quartz tube was loaded with 25 mg of ECAT and packed with quartz wool, after which the quartz tube was placed in a Thermcraft Furnace. A $O_2$(5%)/He(95%) mixture was passed through the quartz tube with the ECAT at a flow rate of 30 sccm. Under the flow of the $O_2$/He mixture, the furnace was heated up to 900° C. at a rate of 10° C./min and then held at 900° C. for 30 minutes. The outlet gas was fed into a catalyst bed at 400° C. with a Ni/Alumina catalyst under a constant flow of 45 sccm of $H_2$, which converts the $CO_2$ and CO to methane. The methane was then fed to a Flame Ionizing Detector (SRI 110 detector) where the stream mixed with 80 sccm of air and 10 sccm of $H_2$ to combust for the detector, allowing for quantification of the amount of carbon on the ECAT.

EXAMPLES

The methods and compositions of the present disclosure, having now been generally described, will be more readily understood by reference to the following examples and embodiments, which are included merely for purposes of illustration of certain aspects and embodiments of the present disclosure, and are not intended to be limiting. The following detailed examples of systems and/or methods are to be construed, as noted above, only as illustrative, and not as limitations of the disclosure in any way whatsoever. Those of ordinary skill in the art will promptly recognize appropriate variations from the various structures, components, compositions, procedures, and methods disclosed herein.

Example 1

Production and Analysis of ECAT MWNT

Samples of two types of spent ECAT removed from an FCC unit, obtained for testing from Equilibrium Catalyst, Inc., were exposed to conditions for growth of CNTs with the ECAT as the catalytic substrate. Experiments were then performed on the resulting ECAT MWNT compositions.

Materials

The first type of spent ECAT had a high Ni content of 3370 ppm (referred to herein as ECAT-1). The second type of ECAT had a comparatively low Ni content of 700 ppm (referred to herein as ECAT-2). These two catalysts when combined have sufficient differences in Ni content for a separation to be achieved as discussed below (Example 2).

Procedures

Figure 2:
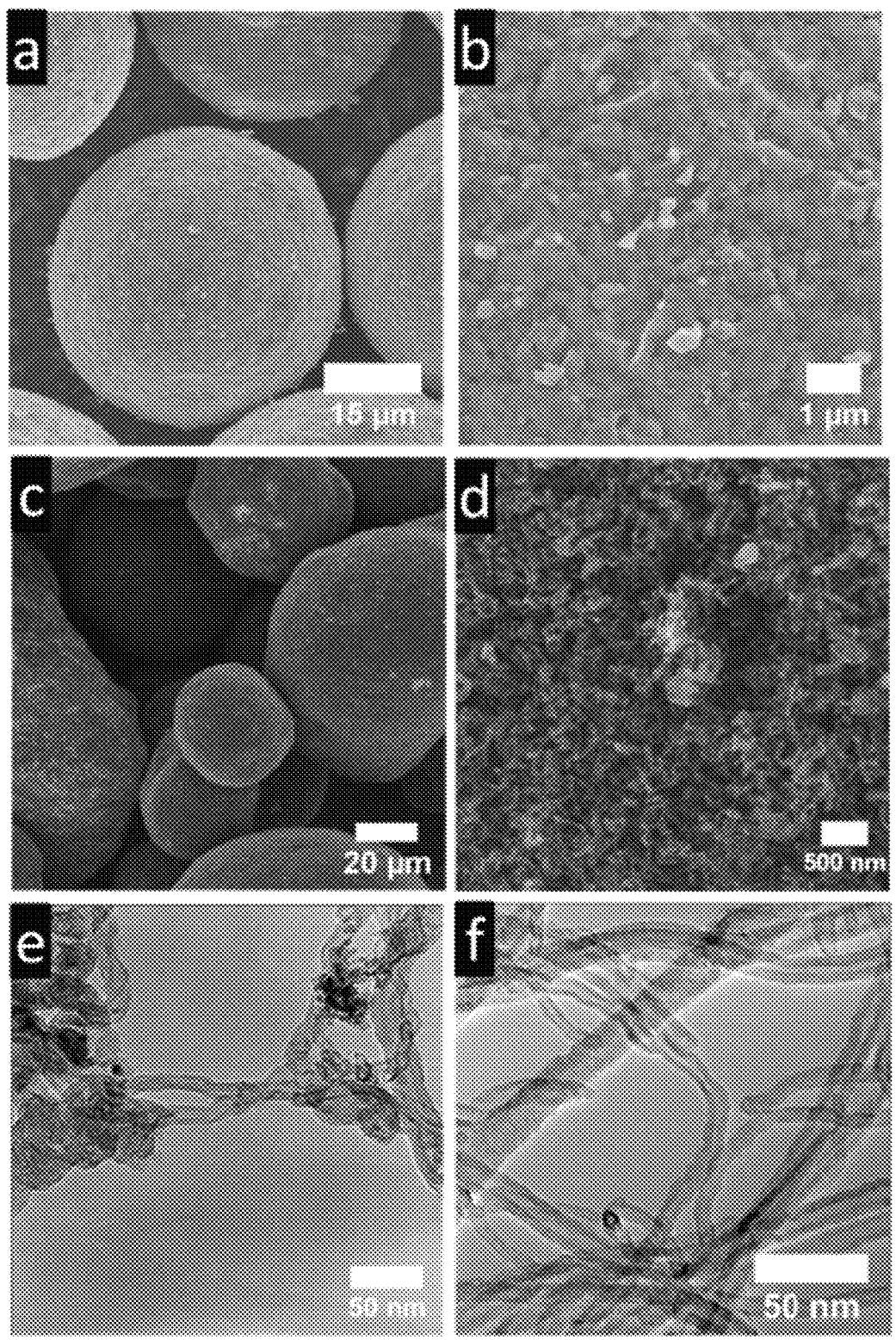
FIG. 2 shows scanning electron microscopy (SEM) images of (Panel a) a mixture of ECAT-1 and ECAT-2 (ECAT-Mix) reduced at 560° C. and treated under conditions for growing multi-walled carbon nanotubes (MWNTs), (Panel b) ECAT-Mix reduced at 560° C. and treated under conditions for growing MWNTs, (Panel c) ECAT-Mix reduced at 850° C. and treated under conditions for growing MWNTs, and (Panel d) ECAT-Mix reduced at 850° C. and treated under conditions for growing MWNTs.

The first step in separating ECAT by metal content requires making ECAT with high metal content hydrophobic to differentiate ECAT of low metal content, which will remain hydrophilic. Nickel is a primary metal which contaminates ECAT during FCC operation and resides mostly on the surface of the ECAT particles. For sufficient growth of carbon nanotubes to occur, the metal contaminants on the ECAT surface must first be sufficiently reduced. Temperature programmed reduction (TPR) was conducted on the ECAT-1 and ECAT-2 samples to identify a temperature to be used for further testing. TPR profiles of ECAT-1 and ECAT-2 showed two large peaks at 550° C. and 850° C. (FIG. 1, Panel a). The peak at 550° C. was due to reduction of vanadium, and the peak at 850° C. was due to reduction of nickel. The nickel on the ECAT surface is in the form of nickel aluminate and requires a high temperature to reduce. The outcome of treating the ECAT at 560° C. and at 850° C. is shown in FIG. 2 (Panels a-d). Reducing the nickel generates a higher surface density of MWNTs on the ECAT particles, which is important for creating a hydrophobic barrier over the spent ECAT surface to achieve a separation. A temperature of 850° C. was used for ECAT reduction in further testing, although any temperature or temperatures which result in suitable reduction of nickel on the ECAT particle surface may be utilized.

CNT growth on the spent ECAT to form ECAT MWNT was performed in a fluidized bed reactor. One gram of ECAT sample was added to a one inch diameter glass tube on top of a quartz frit in the center of the quartz tube. Reduction of the ECAT occurred by ramping to 850° C. in 85 minutes with a flow of 300 sccm of $H_2$. The temperature was held at 850° C. for 30 minutes with the same flow of $H_2$. Following this the reactor was cooled with a flow of 300 sccm of $N_2$ until the temperature reached 760° C. The reaction then proceeded at 760° C. for 30 minutes with a flow of 200 sccm of $C_2H_4$ and 200 sccm of $N_2$. After the reaction step, the reactor was allowed to cool to room temperature with a flow of 300 sccm of $N_2$.

Figure 4:
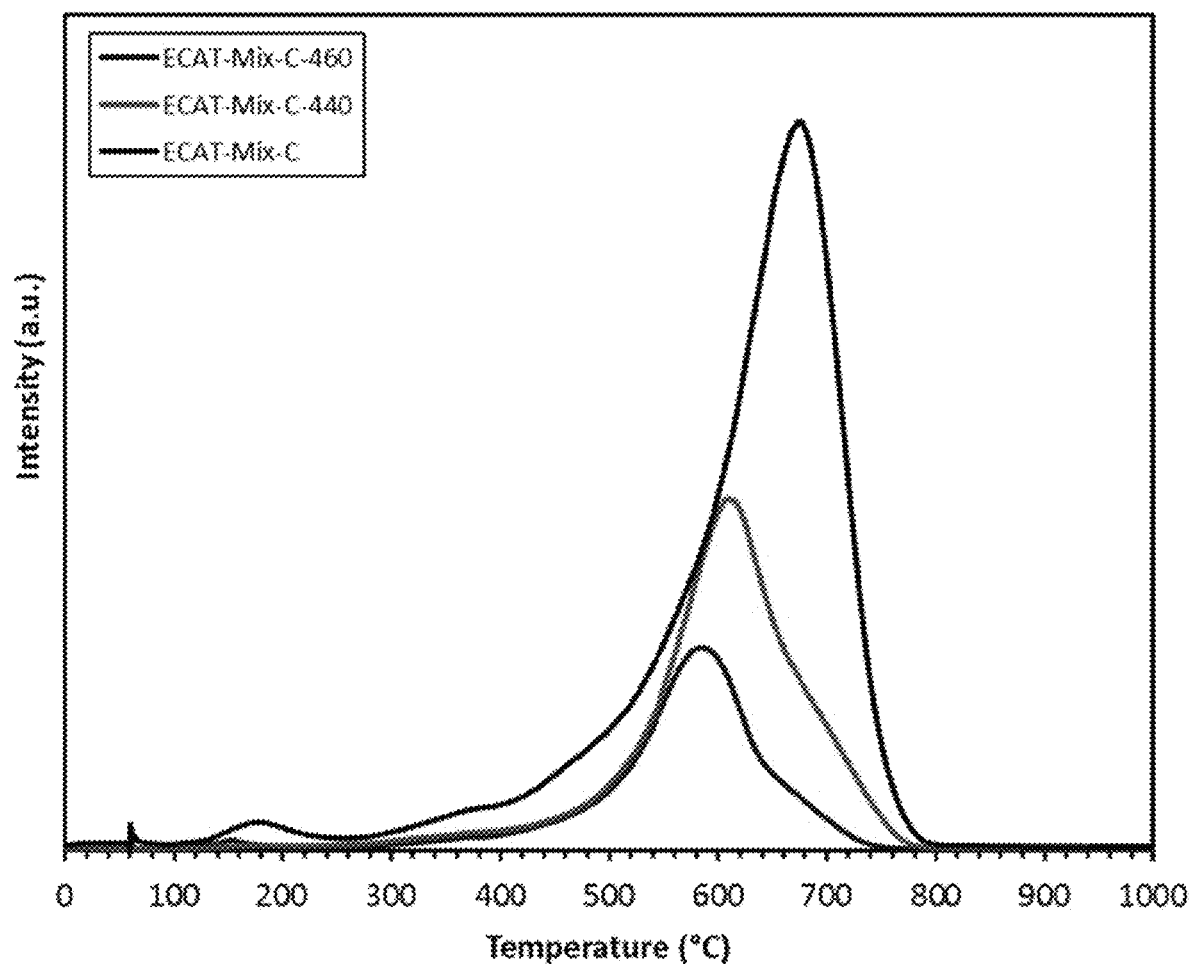
FIG. 4 is a graphical depiction of the TPO profiles for ECAT-Mix-C, ECAT-Mix-C-440, and ECAT-Mix-C-460 (ECAT-Mix-C was calcined at two different temperatures to partially burn the carbon on the ECAT-Mix-C; Calcination at 440° C. provided ECAT-Mix-C-440, and calcination at 460° C. provided ECAT-Mix-C-460).

The resulting ECAT MWNT was then calcined to remove a portion of the amorphous carbon on the ECAT using a Jelenko accu-therm II oven. The ECAT MWNT was loaded into the oven at room temperature, and then the oven was set to one of two temperatures: 440° C. or 460° C. The oven ramped at 1° C./second to the set temperature. The set temperature was held for twelve hours. FIG. 4 is a graphical depiction of the TPO profiles for ECAT-Mix-C, ECAT-Mix-C-440 (ECAT-Mix-C calcined at 440° C.), and ECAT-Mix-C-460 (ECAT-Mix-C calcined at 460° C.

ECAT-1 after carbon nanotube growth (ECAT-1-C) had a higher surface density of MWNTs than ECAT-2 after carbon nanotube growth (ECAT-2-C). Only a few MWNTs were visible on sample ECAT-2-C particles. TEM images of MWNTs for ECAT-1-C can be seen in FIG. 2 (Panel c), and MWNTs for ECAT-2-C can be seen in FIG. 2 (Panel d). The MWNTs measured for ECAT-1-C had average outer and inner diameters of 13.5 nm and 6.1 nm, respectively, and an average of 11 walls. Large carbon fibers were observed on ECAT-1-C, which may be from large nickel particles on the ECAT surface. MWNTs for ECAT-2-C had average outer and inner diameters of 10.3 nm and 4.2 nm, respectively, and an average of nine walls.

Example 2

Separation of High Metal ECAT MWNT from Low Metal ECAT MWNT

This example describes how high metal ECAT MWNT can be separated from low metal ECAT MWNT based on differential hydrophobicity.

Procedures

Separation of spent ECAT particles based on differential nickel content was investigated using a biphasic hydrocarbon/water mixture. 150 mL of decalin and 150 mL of water were added to a 400 mL beaker. In alternative embodiments, other hydrophilic hydrophobic liquid/liquid mixtures could be used to create a biphasic mixture for separating ECAT based on metal content in the particles. For example, decalin could be replaced with other alkanes and aromatics, such as (but not limited to) pentane, heptane, dodecane, toluene, or benzene, and salt or polymer could be added to water, or water could be replaced with ionic liquid. Further, a polymer could be added to the oil phase. In the next step, fifty milligrams of an ECAT sample was slowly dropped into the biphasic mixture. Once the ECAT material settled to the oil-water interface or to the bottom of the beaker, the beaker was then gently swirled for 30 seconds to further remove ECAT at the oil-water interface, which might have been stacked on top of one another. Following this, a pipette was used to remove the ECAT which had collected at the oil-water interface. After removing the ECAT at the oil-water interface, more decalin and water were added to keep the volume of oil and water consistent. Next, more ECAT sample was added to the biphasic system, and the process was repeated. The ECAT particles which resided at the interface and sunk into the water were both sent to Galbraith Laboratories, Inc. (Knoxville, Tenn.) for analysis with inductively coupled plasma-optical emission spectrometry (ICP-OES) to measure the nickel content of the sample (providing results such as those shown in FIG. 5). In other embodiments, the biphasic system could comprise two aqueous phases, two hydrocarbon phases, a fluorine phase and a water/oil phase, or a silicon oil phase and a water/oil phase.

Figure 3:
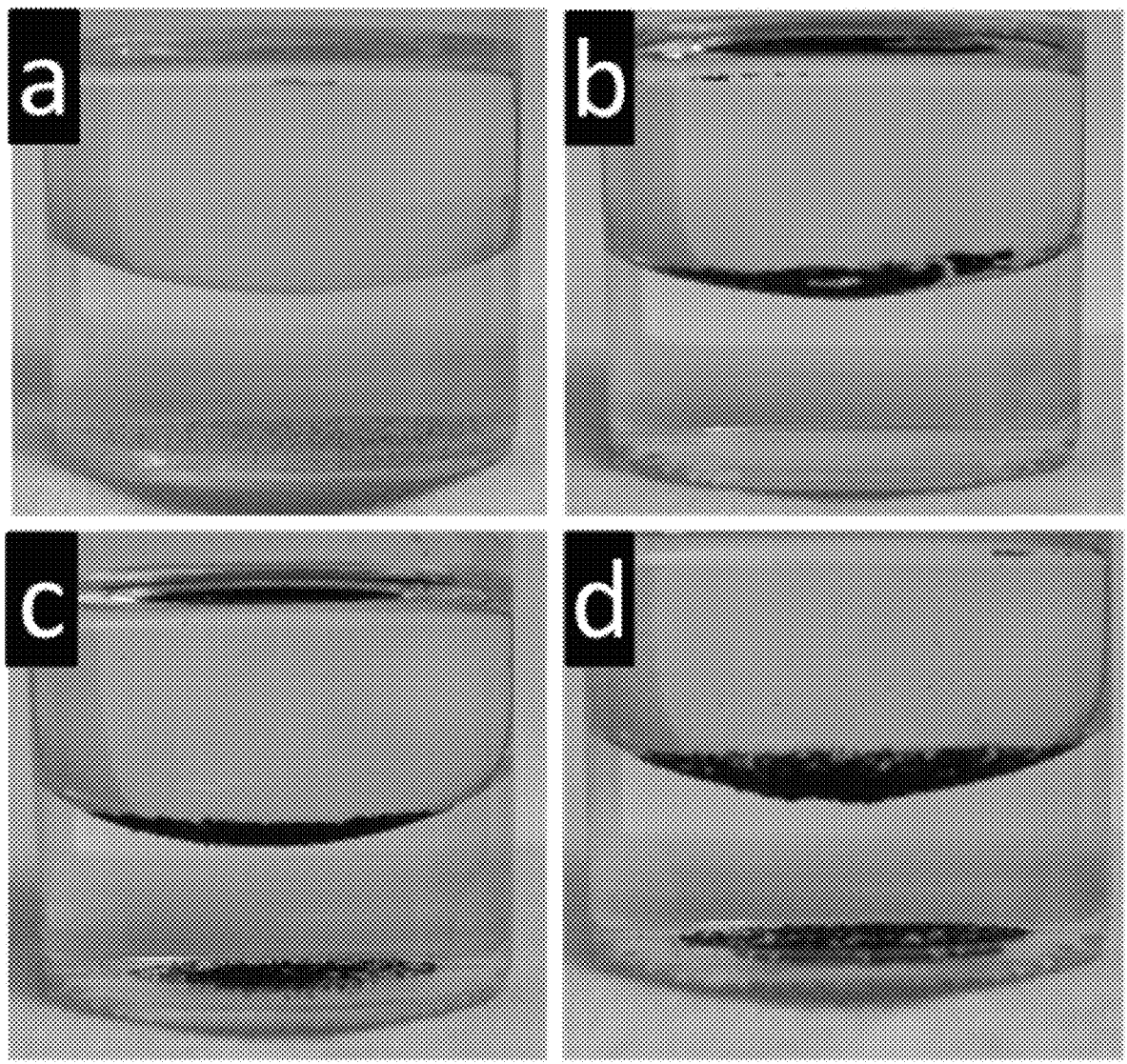
FIG. 3 shows digital photographs of (Panel a) ECAT-Mix in a biphasic (oil/water) system, (Panel b) ECAT-Mix-C in the biphasic system, (Panel c) ECAT-Mix-C-440 in the biphasic system, and (Panel d) ECAT-Mix-C-460 in the biphasic system.

When a 1:1 mixture by weight of ECAT-1 and ECAT-2 (ECAT-Mix) is disposed into a vial of decalin and water, the ECAT-Mix passes through the oil and into the water, settling at the bottom of the vial (FIG. 3, Panel a). ECAT-Mix which has been exposed to conditions causing carbon nanotube growth and thereby form ECAT-Mix-C (non-calcined), maintained hydrophobicity and resided entirely at the oil-water interface (FIG. 3, Panel b). ECAT-Mix-C resided at the oil-water interface due to carbon being deposited over the ECAT MWNT particle surface.

The ECAT-Mix-C was calcined at two different temperatures to partially burn the amorphous surface carbon on the ECAT-Mix-C. ECAT-Mix-C was calcined at 440° C. (forming a product referred to herein as ECAT-Mix-C-440) and 460° C. (forming a product referred to herein as ECAT-Mix-C-460). These two temperatures were chosen from TPO data of sample ECAT-Mix-C and by observing some of the ECAT particles changing color from black to brown due to carbon being burned from the surface of the ECAT. ECAT-Mix-C-440 and ECAT-Mix-C-460 were then added to the oil/water mixture, wherein portions of the ECAT-Mix-C-440 sample resided both at the oil-water interface and in the water phase (FIG. 3, Panel c), and portions of the ECAT-Mix-C-460 sample resided both at the oil-water interface and in the water phase (FIG. 3, Panel d).

Figure 5:
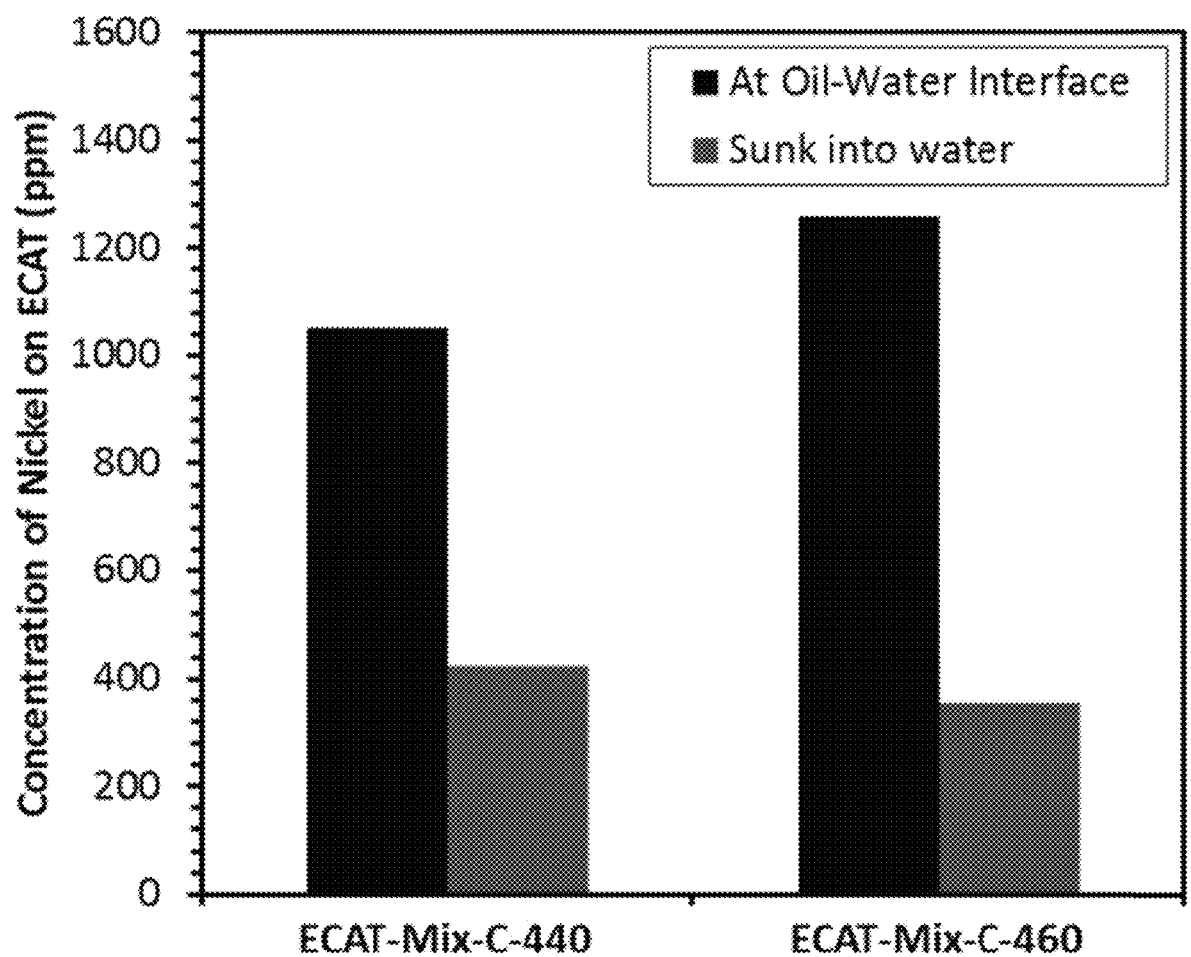
FIG. 5 is a graphical depiction of results obtained from inductively coupled plasma-optical emission spectrometry (ICP-OES) for portions of ECAT-Mix-C-460 and ECAT-Mix-C-440 which resided at the oil-water interface and migrated into the water phase.

ICP-OES analysis of samples of ECAT-Mix-C-440 and ECAT-Mix-C-460 which migrated to reside at the oil-water interface and in the water phase revealed a significant difference in the nickel content between the interface particles and the water phase particles. ECAT-Mix-C-440 and ECAT-Mix-C-460 particles at the oil-water interface had significantly higher nickel content than the ECAT-Mix-C-440 and ECAT-Mix-C-460 particles in the water phase (FIG. 5). In the presence of higher nickel content, more MWNTs are grown on the surface of the ECAT. The high quantity of MWNTs and their inherent hydrophobicity allow for the ECAT to be coated in a film of oil (see Example 3 for further discussion of the oil coating). This film of oil on the MWNTs contributes to the hydrophobicity and keeps it from passing through the oil-water interface and into the water. ECAT with low nickel content has fewer (if any) MWNTs, and little to no oil film is created on the ECAT surface; thus, the ECAT passes through the oil-water interface and migrates into the water phase. SEM results confirmed that more of the ECAT particles at the oil-water interface had MWNTs than the ECAT particles in the water phase.

The effect of CNT growth on the catalytic activity of the ECAT was investigated. For this test, a dehydration reaction (the conversion of 1-dodecanol to dodecene) which requires acid sites was used. Reactions were conducted in a 100 mL Parr reactor. 500 mg of ECAT and 60 mL of decalin were added to the reactor vessel. The reactor was then pressurized with $N_2$ to 300 psi. Next, the reactor was heated to 200° C. and the stir speed set at 80 rpm. Once 200° C. was reached, a mixture of 1-dodecanol in decalin was injected using a pressure of 500 psi of $N_2$. The concentration of the solution injected made the solution in the reactor after injection 0.2 M of 1-dodecanol in decalin. The reaction was allowed to proceed for one hour and the pressure kept at 500 psi. Quantification of products and reactants was conducted using an Agilent 7890B Gas Chromatograph—Flame Ionization Detector (GC-FID) (Agilent Technologies, Inc., Santa Clara, Calif.) equipped with a capillary, low-polarity column (Phenomenex ZB-6) of 60.0 m×0.25 mm×0.25 µm (Phenomenex Inc., Torrance, Calif.). Commercially available standards were used to identify the reactants and products. For all of the GC-FID analyses, decane was used as an external standard for calculating the carbon balances. All carbon balances were better than 90%.

Figure 6:
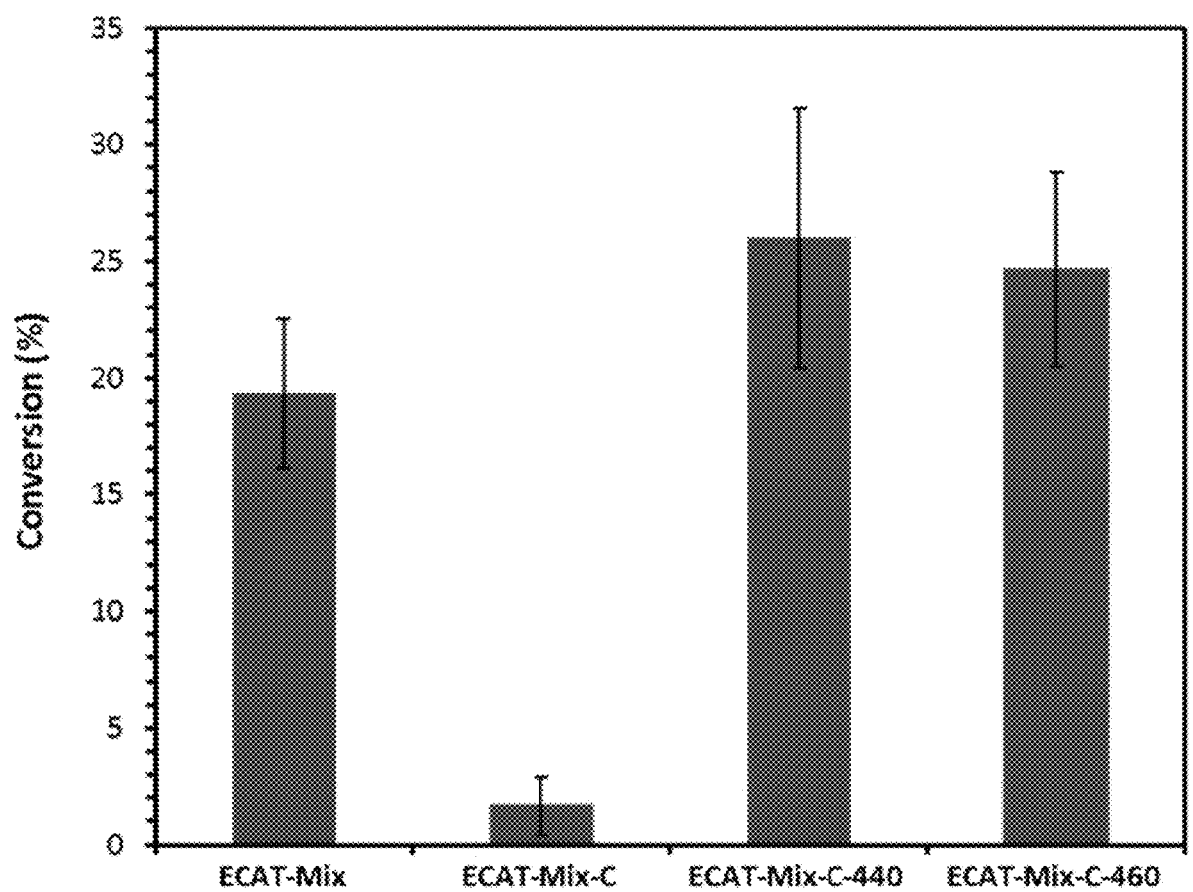
FIG. 6 is a graphical depiction of the changes in catalytic activity due to carbon nanotube growth and separation processes for the reactions with ECAT-Mix, ECAT-Mix-C, ECAT-Mix-C-440, and ECAT-Mix-C-460 for comparison.
Figure 9:
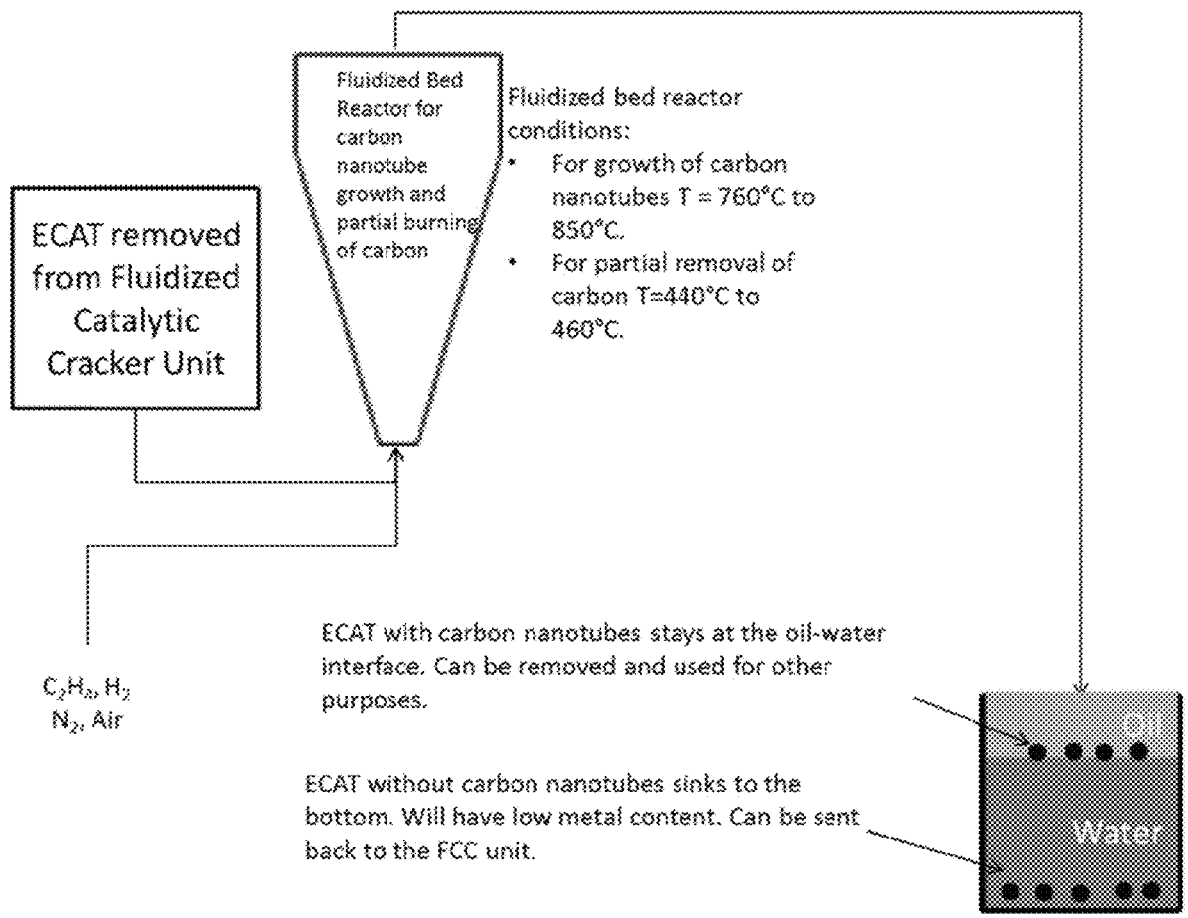
FIG. 9 is a schematic of a system for the production of ECAT MWNT material and for the separation of high metal content ECAT MWNT from low metal content ECAT composition using a biphasic oil-water mixture (see Examples 1 and 2).

Conversion of 1-dodecanol to dodecene was similar for catalyst ECAT-Mix (i.e., ECAT-mix without CNTs), ECAT-Mix-C-440, and ECAT-Mix-C-460 (FIG. 6), indicating that the growth of carbon nanotubes (followed by calcination) does not decrease catalytic activity. For sample ECAT-Mix-C, there was no conversion of 1-dodecanol to dodecene. Thus, non-calcined ECAT MWNT (ECAT-Mix-C) which had not been partially burned (calcined) had little to no catalytic activity. Without wishing to be bound by theory, it is believed this result was due to deposition of amorphous carbon from the carbon-containing gas on the ECAT acid sites during CNT formation on the ECAT particles. A partial burning (calcination) of the ECAT samples at 440° C. and 460° C. removed the carbon from the acid sites, thereby regenerating catalytic activity (FIG. 6) in a manner similar to the process used during operation of an FCC to restore spent ECAT. The presence of CNTs on the ECAT particles, therefore, does not decrease the catalytic activity of the ECAT. Thus, ECAT MWNT with low nickel content can be recovered and reused in an FCC unit after separation from high metal content ECAT MWNT. Alternate oils or hydrocarbons, which wet the ECAT MWNT to a different degree, and different partial burn (calcining) temperatures may be used as noted above. FIG. 9 shows a schematic of a system for the production of ECAT MWNT material and for the separation of high metal content ECAT MWNT from low metal content ECAT composition using a biphasic oil-water mixture as described above.

Example 3

Use of ECAT MWNT to Absorb Oil

In at least one embodiment of the present disclosure, ECAT MWNT (a "carbon nanotube sponge material") can be used for oil recovery to remediate waters or areas contaminated by oil spills.

Procedures

Figure 7:
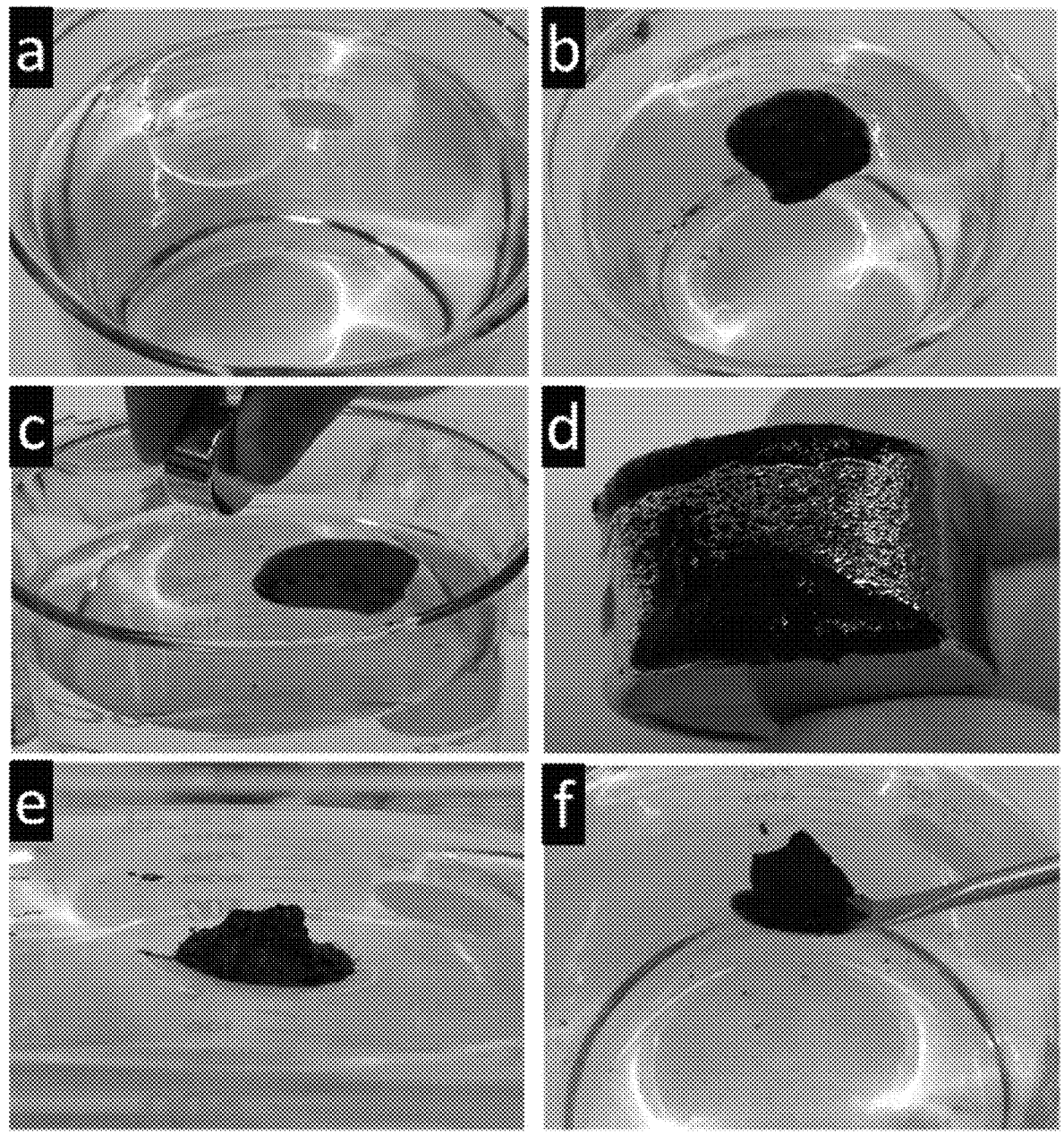
FIG. 7 shows digital photographs of (Panel a) oil on the surface of water, (Panel b) ECAT-Mix-C-440-Ni absorbing the oil on the surface of the water, (Panel c) ECAT-Mix-C-440-Ni being moved across the surface of the water by a magnet to absorb oil, (Panel d) ECAT-Mix-C-440-Ni with oil removed from the surface of the water by a magnet, (Panel e) ECAT-Mix-C-440-Ni clumped together after absorbing all of the oil on the surface of the water, and (Panel f) ECAT-Mix-C-440-Ni with absorbed oil removed from the water by a spatula.

ECAT particles were made hydrophobic by the growth of carbon nanotubes thereon as described above. Since the MWNTs on the ECAT particles can absorb oil, the ability of the particles to absorb oil was tested. Carbon nanotubes made into sponges for recovering oil on the surface of water have been found herein to have a high mass sorption capacity. Mass sorption capacity experiments show ECAT MWNT of high nickel content (ECAT-Mix-C-440-Ni), after separation from low metal ECAT MWNT, had a mass sorption capacity for decalin of 1.83 g/g 0.08. Sample ECAT-Mix-C-440-Ni is capable of floating on water or being poured onto the oil on the water. Oil spill recovery tests were performed by filling a beaker with water and then adding one mL of decalin. An ECAT MWNT composition sample of ECAT-Mix-C-440-Ni was then deposited onto the oil, which the sample began to absorb. ECAT-Mix-C-440-Ni disposed on water having oil contamination interacted with the oil on the surface of the water and absorbed the oil on the water surface, as shown in FIG. 7, Panels a-b.

Once the sample was saturated with oil, the sample was removed from the surface of the water and weighed. The amount of oil the sample absorbed was calculated from the difference in weight of the sample after and before recovering the oil. ECAT particles on the surface of the water or in oil could be moved over the water surface by moving a neodymium magnet less than about one cm from the surface of the water. ECAT particles with oil could be extracted by touching the ECAT particles with the magnet. The use of the neodymium magnet in this Example is for illustrative purposes only; any other type of magnet, including but not limited to iron magnets or electromagnets, could be used, and as such, falls within the scope of the present disclosure.

After ECAT-Mix-C-440-Ni has absorbed the oil, the particles can be recovered in one of at least two ways. The first method utilizes the high metal content of sample ECAT-Mix-C-440-Ni allowing for a magnet to be used to move the ECAT over the surface of the water to collect more oil (FIG. 7, Panel c) and recover the ECAT particles saturated with oil from the surface of the water (FIG. 7, Panel d). Carbon nanotube sponges have been made magnetic through incorporation of magnetic particles, which allows for the sponges to be moved across the water surface to collect oil. The advantage of using ECAT MWNT material is that the nickel is already incorporated during the FCC process from crude oil. Another method to recover ECAT-Mix-C-440-Ni is to scoop the particles from the surface of the water. Interestingly, once enough ECAT-Mix-C-440-Ni has been added to soak up all of oil, the ECAT-Mix-C-440-Ni particles clump together (FIG. 7, Panel e) and can be easily scooped up from the water as an agglomerate of ECAT-Mix-C-440-Ni particles (FIG. 7, Panel f).

Figure 8:
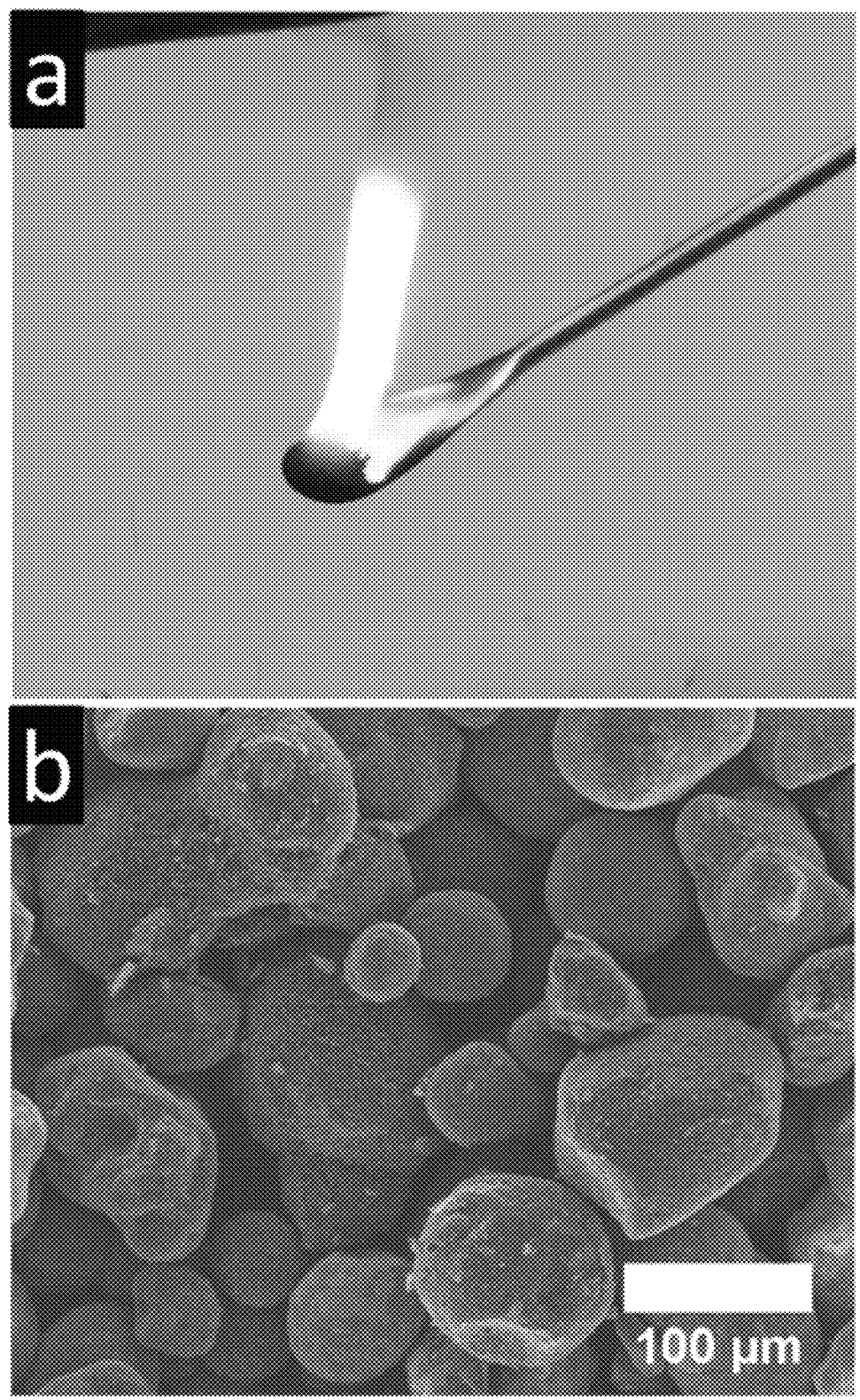
FIG. 8 shows (Panel a) a digital photograph of ECAT-Mix-C-440-Ni being burned after soaking up oil, and (Panel b) an SEM image of ECAT-Mix-C-440-Ni after soaking up oil and after being burned.

Once the particles have been recovered from the surface of the water, oil can be recovered by heating ECAT-Mix-C-440-Ni under an inert environment, which allows for the absorbed oil to be recovered, or the oil can be burned without harming the MWNTs on the ECAT surface (FIG. 8). Once the oil has been removed, the ECAT-Mix-C-440-Ni particles can be used again to recover oil from the surface of the water with little change in the mass sorption capacity, 1.84 g/g±0.1.

Use of solid particles of ECAT MWNT material is also a more environmentally friendly option for cleaning up oil spills than many conventionally-used techniques. For example, the surfactant COREXIT® 9500A (Nalco Environmental Solutions LLC, Sugarland, Tex.) used during the Deep Water Horizon spill was found to increase the toxicity of the oil. ECAT with MWNTs can absorb oil, can be re-used, can be recovered from the environment with mechanical and magnetic methods, and will be of low cost.

Therefore, in certain non-limiting embodiments, the present disclosure is directed to an oil spill remediation method, in which a carbon nanotube sponge material is disposed on an area contaminated by an oil spill, wherein oil from the oil spill is absorbed into the carbon nanotube sponge material. The carbon nanotube sponge material is then removed from the area contaminated by the oil spill. The carbon nanotube sponge material may comprise spent equilibrium catalyst (ECAT) particles having carbon nanotubes thereon, or the carbon nanotube sponge material may comprise catalyst material upon which the carbon nanotubes are formed.

Example 4

Alternate Separation Methods

Figure 10:
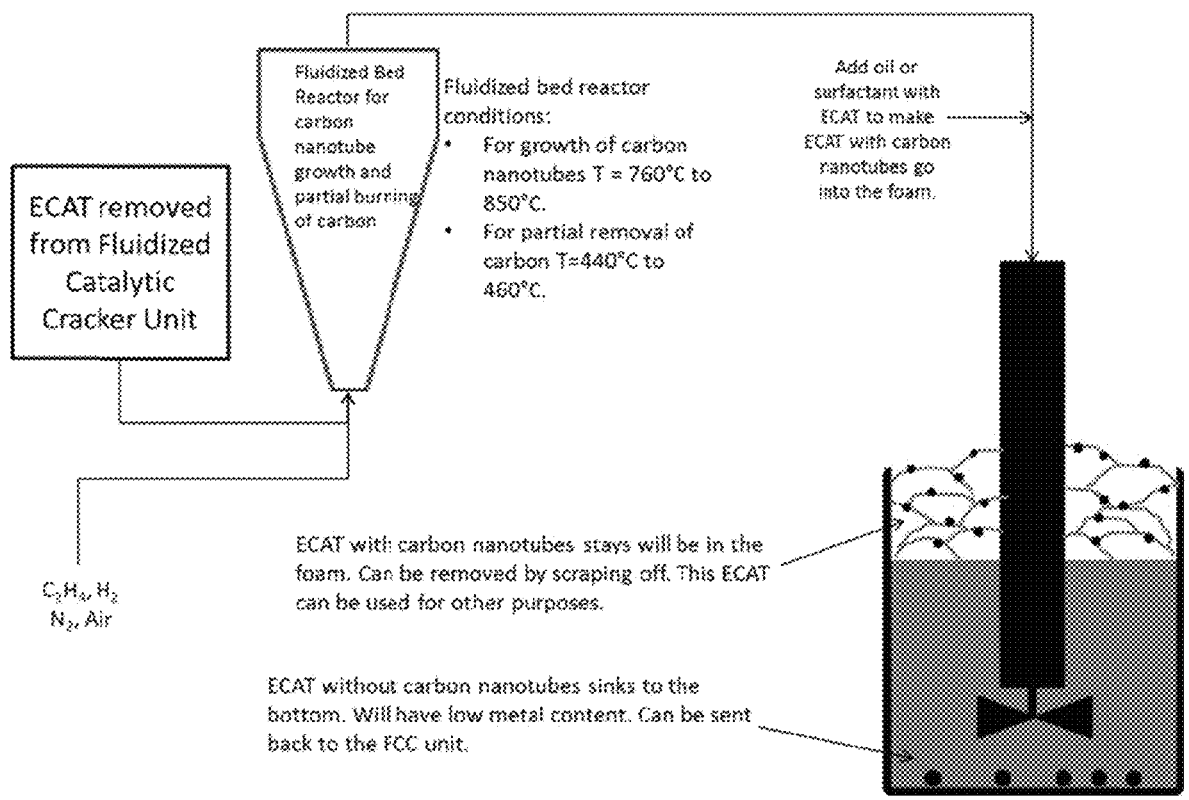
FIG. 10 is a schematic of a system for the production of ECAT MWNT material and for the separation of high metal content ECAT MWNT from low metal content ECAT composition using a froth floatation method.

The separation process of using particles of different wettability and a biphasic system as described herein is similar to a froth floatation used in the mining industry. Typically in such systems, the high value material is made hydrophobic and the low value material made hydrophilic, wherein the foam traps the high value, hydrophobic material and is extracted, while the low value, hydrophilic material is not trapped in the foam. An example of this is in the coal industry, where froth floatation is used to separate coal, a hydrophobic material, from non-valuable, hydrophilic material, due to differences in wettability (e.g., see U.S. Pat. No. 5,936,216; the entire contents of which are hereby expressly incorporated herein by reference). However, a contrary process is used in the methods of the present disclosure, wherein by growing MWNTs on ECAT, the high metal ECAT desired to be removed is made hydrophobic and separated from the more valuable low metal ECAT, which can be sent back to the FCC unit. FIG. 10 displays a schematic for froth floatation separation of ECAT MWNT material. Froth floatation can be used to separate ECAT with different levels of metal content.

Figure 11:
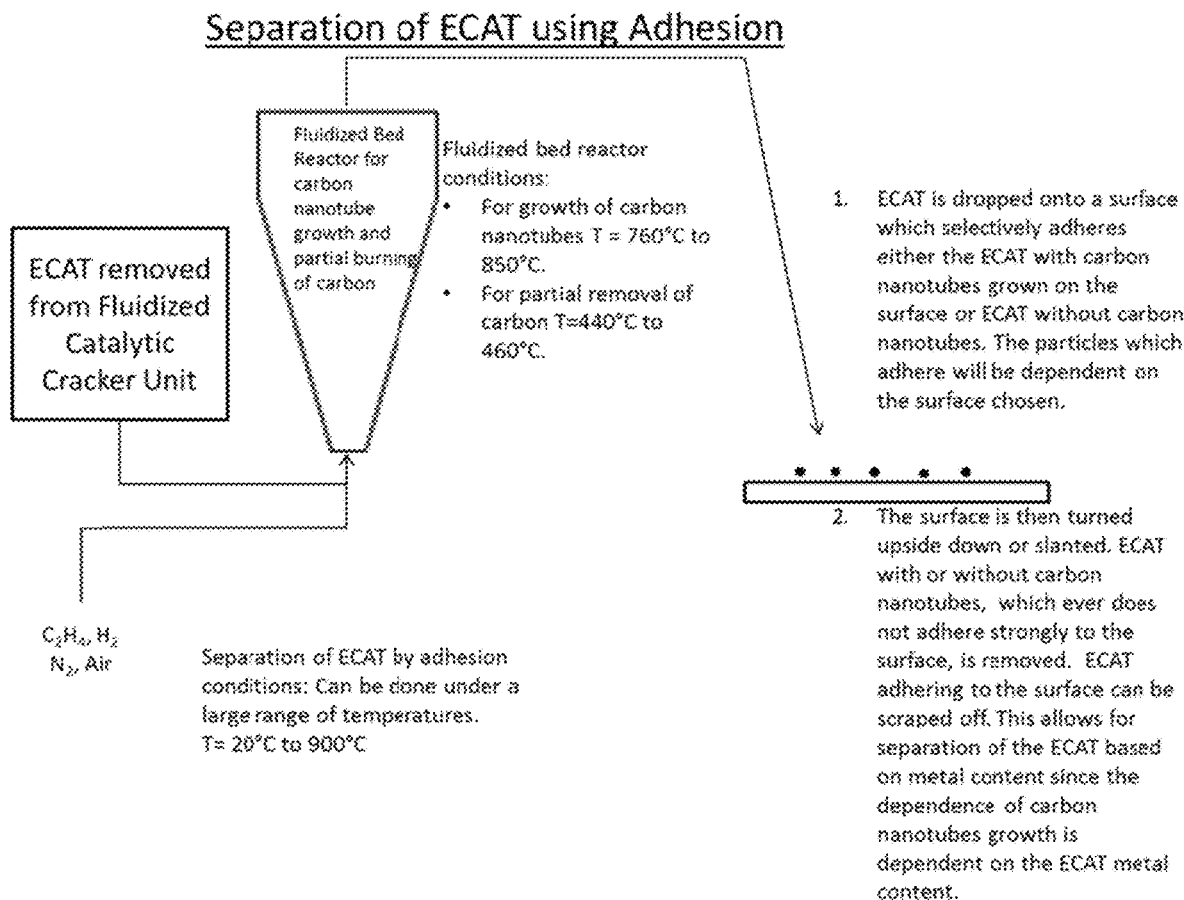
FIG. 11 is a schematic of a system for the production of ECAT MWNT material and for the separation of high metal content ECAT MWNT from low metal content ECAT composition using particle adhesion.
Figure 12:
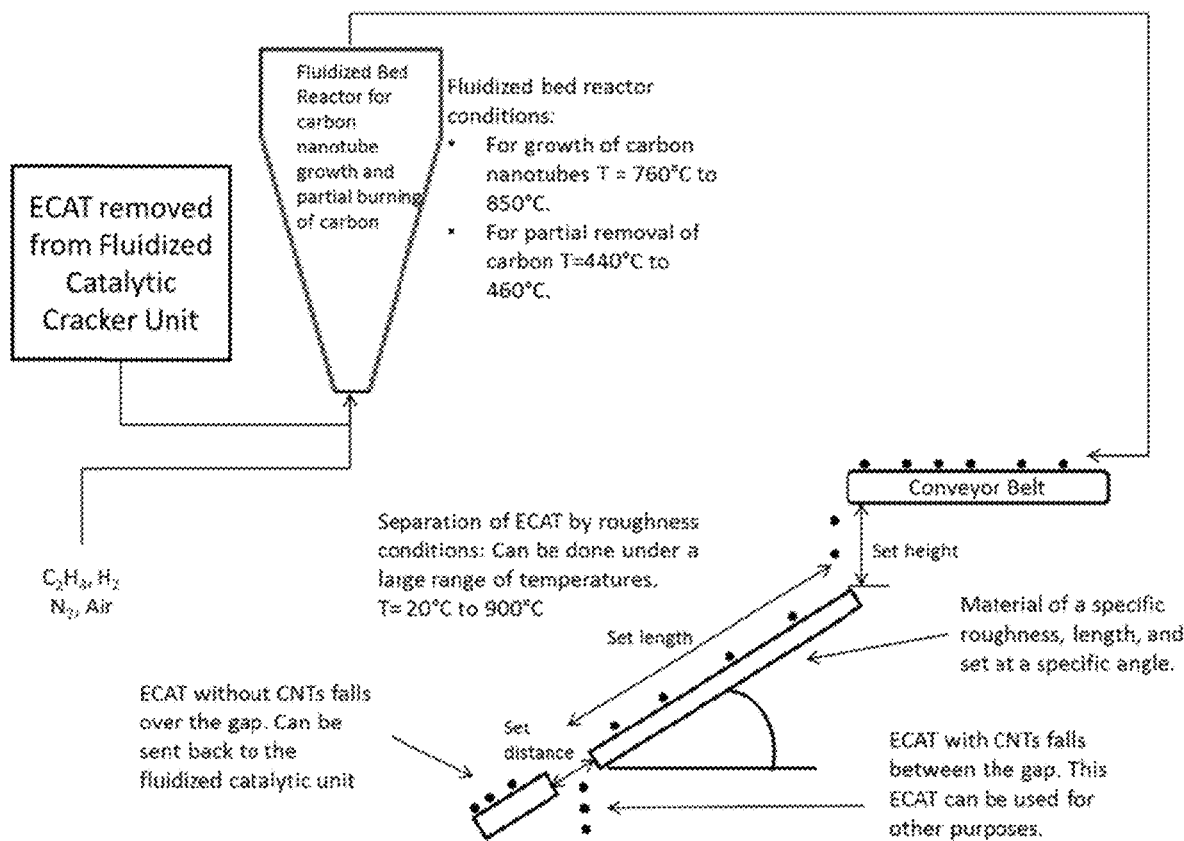
FIG. 12 is a schematic of a system for the production of ECAT MWNT material and for the separation of high metal content ECAT MWNT from low metal content ECAT composition using particle roughness.

ECAT MWNT can also be separated by the different adhesion and roughness properties that ECAT MWNT particles display with varying amounts of MWNTs grown thereon. FIGS. 11 and 12 display schematics of methods for the separation of ECAT MWNT materials based on adhesion and roughness, respectively. By taking advantage of the interaction of a rough nanotube sample with an inclined surface, the velocity of the ECAT particles can change. This can be used to separate particles based on the kinetic energy they carry as they fall off of an incline. Particles absent of nanotubes containing weaker attractive forces with the solid surface can, for example, travel farther at the end of an incline. An advantage of an approach such as this is that it can be conducted at high temperatures, possibly as an extension of an existing FCC unit, without requiring cooling of the ECAT particles.

After achieving a successful separation of ECAT with different levels of metal content, another way to determine if a successful separation was achieved was observed. SEM images of ECAT MWNT particles demonstrated that ECAT with different amounts of CNTs thereon have differences in contrast, which are due to differences in the amounts of particles in the ECAT MWNT material being coated in carbon. ECAT without carbon on the surface is brighter than ECAT coated with carbon, since the carbon acts as a conductor and keeps electrons from building up on the ECAT. With validation from the ICP-OES results that separation can be achieved (e.g., see FIG. 5), the difference in contrast of the ECAT particles can be used to give an approximate measure as to whether separation based on metal content is achieved. For example, ECAT MWNT particles at the oil-water interface will be darker than ECAT MWNT material which is in the water phase and has little or no CNTs.

Example 5

Additional Uses for High Metal ECAT MWNT

An alternative use of high metal ECAT MWNT is as a source for harvesting the MWNTs from the ECAT. MWNTs and CNTs in general can be used as catalyst supports, super hydrophobic coatings, emulsifiers, or incorporated in lithium-ion batteries, sensors, transistors, thermal cooling devices, yarns, and compressible foams. Production cost of carbon nanotubes can be decreased, since this low value catalyst is typically sent to a landfill. Since ECAT can have different metal loadings, there is a possibility to grow carbon nanotubes with different properties and create low cost carbon nanotubes.

Accordingly, in at least one non-limiting embodiment, the present disclosure is directed to a method of treating spent equilibrium catalyst (ECAT) for reuse, the method comprising the steps of: (1) disposing a quantity of spent ECAT into a reactor, the spent ECAT comprising: (i) low metal particles having a low level of metal contamination thereon below a predetermined metal content separation point; and (ii) high metal particles having a high level of metal contamination thereon above the predetermined metal content separation point; and (iii) wherein the low metal particles and high metal particles are hydrophilic; (2) treating the spent ECAT in the reactor with a carbon-containing gas or fluid under carbon nanotube-forming conditions, wherein the carbon-containing gas or fluid is converted to a quantity of carbon nanotubes on the high metal particles of the spent ECAT such that the high metal particles are rendered hydrophobic while the low metal particles remain hydrophilic; (3) combining the treated spent ECAT with a biphasic mixture comprising a hydrophobic component and a hydrophilic component, wherein the high metal particles primarily reside in the hydrophobic component and the low metal particles primarily reside in the hydrophilic component; and (4) isolating the low metal particles from the hydrophilic component to form low metal spent ECAT. The method may comprise reusing the low metal spent ECAT in a fluidized catalytic cracking (FCC) unit. The carbon nanotubes used in the method may comprise multi-walled carbon nanotubes. The low metal spent ECAT may comprise low metal particles having carbon nanotubes thereon. The method may further comprise the step of heating the treated spent ECAT to remove amorphous carbon before combining the treated spent ECAT with the biphasic mixture. The predetermined metal content separation point may be in a range of 200 ppm to 10000 ppm. For example (but not by way of limitation), the predetermined metal content separation point may be selected from the group consisting of 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 2000 ppm, 3000 ppm, 4000 ppm, 5000 ppm, 6000 ppm, 7000 ppm, 8000 ppm, 9000 ppm, and 10000 ppm. The metal of the high metal particles may be primarily nickel.

In at least one non-limiting embodiment, the present disclosure is directed to a method of treating spent equilibrium catalyst (ECAT) for reuse, the method comprising the steps of: (1) disposing a quantity of spent ECAT into a reactor, the spent ECAT comprising: (i) low metal particles having a low level of metal contamination thereon below a predetermined metal content separation point; and (ii) high metal particles having a high level of metal contamination thereon above the predetermined metal content separation point; and (iii) wherein the low metal particles and high metal particles are hydrophilic; (2) treating the spent ECAT in the reactor with a carbon-containing gas or fluid under carbon nanotube-forming conditions, wherein the carbon-containing gas or fluid is converted to a quantity of carbon nanotubes on the high metal particles of the spent ECAT such that the high metal particles are rendered hydrophobic while the low metal particles remain hydrophilic; (3) combining the treated spent ECAT with a slurrying liquid to form a slurry mixture; (4) aerating the slurry mixture causing formation of a froth component and a non-frothed component, wherein the high metal particles of the treated spent ECAT primarily reside in the froth component and the low metal particles of the treated spent ECAT primarily reside in the non-frothed component; and (5) isolating the low metal particles from the non-frothed component to form low metal spent ECAT. The method may comprise reusing the low metal spent ECAT in a fluidized catalytic cracking (FCC) unit. The carbon nanotubes used in the method may comprise multi-walled carbon nanotubes. The low metal spent ECAT may comprise low metal particles having carbon nanotubes thereon. The method may further comprise the step of heating the treated spent ECAT to remove amorphous carbon before combining the treated spent ECAT with the biphasic mixture. The predetermined metal content separation point may be in a range of 200 ppm to 10000 ppm. For example (but not by way of limitation), the predetermined metal content separation point may be selected from the group consisting of 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 2000 ppm, 3000 ppm, 4000 ppm, 5000 ppm, 6000 ppm, 7000 ppm, 8000 ppm, 9000 ppm, and 10000 ppm. The metal of the high metal particles may be primarily nickel.

In at least one non-limiting embodiment, the present disclosure is directed to an oil spill remediation method, comprising the steps of: (1) disposing a carbon nanotube sponge material on an area contaminated by an oil spill, wherein oil from the oil spill is absorbed into the carbon nanotube sponge material; and (2) removing the carbon nanotube sponge material from the area contaminated by the oil spill. The carbon nanotube sponge material used in the method may comprise spent equilibrium catalyst (ECAT) particles having carbon nanotubes thereon. The carbon nanotube sponge material used in the method may comprise catalyst material upon which the carbon nanotubes are formed.

Features of any of the above embodiments may be combined with any of the other above embodiments to create a new embodiment.

It will be understood from the foregoing description that various modifications and changes may be made in the various embodiments of the present disclosure without departing from their true spirit. The description provided herein is intended for purposes of illustration only and is not intended to be construed in a limiting sense. Thus, while embodiments of the present disclosure have been described herein in connection with certain embodiments so that aspects thereof may be more fully understood and appreciated, it is not intended that the present disclosure be limited to these particular embodiments. On the contrary, it is intended that all alternatives, modifications and equivalents are included within the scope of the present disclosure as defined herein. Thus the examples described above, which include particular embodiments, will serve to illustrate the practice of the present disclosure, it being understood that the particulars shown are by way of example and for purposes of illustrative discussion of particular embodiments of the present disclosure only and are presented in the cause of providing what is believed to be a useful and readily understood description of procedures as well as of the principles and conceptual aspects thereof. Changes may be made in the formulation of the various components and compositions described herein, the methods described herein or in the steps or the sequence of steps of the methods described herein without departing from the spirit and scope of the embodiments of the present disclosure.

What is claimed is:

1. A method of treating spent equilibrium catalyst (ECAT) for reuse, the method comprising the steps of:
    disposing a quantity of spent ECAT into a reactor, the spent ECAT comprising:
        low metal particles having a low level of metal contamination thereon below a predetermined metal content separation point, wherein the predetermined metal content separation point is in a range of from 200 ppm to 10000 ppm; and
        high metal particles having a high level of metal contamination thereon above the predetermined metal content separation point; and
        wherein the low metal particles and high metal particles are hydrophilic;
    forming treated spent ECAT by treating the spent ECAT in the reactor with a carbon-containing gas or fluid, wherein the carbon-containing gas or fluid is caused to be converted to a quantity of carbon nanotubes on the high metal particles of the spent ECAT such that the high metal particles are rendered hydrophobic while the low metal particles remain hydrophilic;
    combining the treated spent ECAT with a biphasic mixture comprising a hydrophobic component and a hydrophilic component, wherein the high metal particles primarily reside in the hydrophobic component and the low metal particles primarily reside in the hydrophilic component; and
    isolating the low metal particles from the hydrophilic component to form low metal spent ECAT.

2. The method of claim 1, comprising reusing the low metal spent ECAT in a fluidized catalytic cracking (FCC) unit.

3. The method of claim 1, wherein the carbon nanotubes comprise multi-walled carbon nanotubes.

4. The method of claim 1, wherein the low metal spent ECAT comprises low metal particles having carbon nanotubes thereon.

5. The method of claim 1, further comprising the step of heating the treated spent ECAT to remove amorphous carbon before combining the treated spent ECAT with the biphasic mixture.

6. The method of claim 1, wherein the predetermined metal content separation point is in a range of from 200 ppm to 1000 ppm.

7. The method of claim 1, wherein the predetermined metal content separation point is selected from the group consisting of 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 2000 ppm, 3000 ppm, 4000 ppm, 5000 ppm, 6000 ppm, 7000 ppm, 8000 ppm, 9000 ppm, and 10000 ppm.

8. The method of claim 1, wherein the metal of the high metal particles is primarily nickel.

9. A method of treating spent equilibrium catalyst (ECAT) for reuse, the method comprising the steps of:
    disposing a quantity of spent ECAT into a reactor, the spent ECAT comprising:
        low metal particles having a low level of metal contamination thereon below a predetermined metal content separation point, wherein the predetermined metal content separation point is in a range of from 200 ppm to 10000 ppm; and
        high metal particles having a high level of metal contamination thereon above the predetermined metal content separation point; and
        wherein the low metal particles and high metal particles are hydrophilic;
    forming treated spent ECAT by treating the spent ECAT in the reactor with a carbon-containing gas or fluid, wherein the carbon-containing gas or fluid is caused to be converted to a quantity of carbon nanotubes on the high metal particles of the spent ECAT such that the high metal particles are rendered hydrophobic while the low metal particles remain hydrophilic;
    combining the treated spent ECAT with a slurrying liquid to form a slurry mixture;
    aerating the slurry mixture causing formation of a froth component and a non-frothed component, wherein the high metal particles of the treated spent ECAT primarily reside in the froth component and the low metal particles of the treated spent ECAT primarily reside in the non-frothed component; and
    isolating the low metal particles from the non-frothed component to form low metal spent ECAT.

10. The method of claim 9, further comprising the step of reusing the low metal spent ECAT in a fluidized catalytic cracking (FCC) unit.

11. The method of claim 9, wherein the carbon nanotubes comprise multi-walled carbon nanotubes.

12. The method of claim 9, wherein the low metal spent ECAT comprises low metal particles having carbon nanotubes thereon.

13. The method of claim 9, further comprising the step of heating the treated spent ECAT to remove amorphous carbon before combining the treated spent ECAT with the biphasic mixture.

14. The method of claim 9, wherein the predetermined metal content separation point is in a range of from 200 ppm to 1000 ppm.

15. The method of claim 9, wherein the predetermined metal content separation point is selected from the group consisting of 200 ppm, 250 ppm, 300 ppm, 350 ppm, 400 ppm, 450 ppm, 500 ppm, 550 ppm, 600 ppm, 650 ppm, 700 ppm, 750 ppm, 800 ppm, 850 ppm, 900 ppm, 950 ppm, 1000 ppm, 1050 ppm, 1100 ppm, 1150 ppm, 1200 ppm, 1250 ppm, 1300 ppm, 1350 ppm, 1400 ppm, 1450 ppm, 1500 ppm, 2000 ppm, 3000 ppm, 4000 ppm, 5000 ppm, 6000 ppm, 7000 ppm, 8000 ppm, 9000 ppm, and 10000 ppm.

16. The method of claim 9, wherein the metal of the high metal particles is primarily nickel.

\* \* \* \* \*